US011958752B2

(12) United States Patent
Shao-Horn et al.

(10) Patent No.: US 11,958,752 B2
(45) Date of Patent: Apr. 16, 2024

(54) TRANSITION METAL NITRIDES AS SOLID CARRIERS FOR AMMONIA STORAGE

(71) Applicant: Massachusetts Institute of Technology, Cambridge, MA (US)

(72) Inventors: Yang Shao-Horn, Newton, MA (US); Yuriy Roman, Cambridge, MA (US); Jiayu Peng, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 154 days.

(21) Appl. No.: 17/399,656

(22) Filed: Aug. 11, 2021

(65) Prior Publication Data

US 2022/0048781 A1 Feb. 17, 2022

Related U.S. Application Data

(60) Provisional application No. 63/065,394, filed on Aug. 13, 2020.

(51) Int. Cl.
*C01C 1/02* (2006.01)
*B01J 19/00* (2006.01)

(52) U.S. Cl.
CPC .......... *C01C 1/026* (2013.01); *B01J 19/0013* (2013.01); *C01P 2002/72* (2013.01); *C01P 2002/82* (2013.01); *C01P 2002/85* (2013.01); *C01P 2002/86* (2013.01); *C01P 2004/03* (2013.01)

(58) Field of Classification Search
CPC .. C01C 1/026; C01P 2002/72; C01P 2002/86; C01P 2002/85; C01P 2004/03; C01P 2002/82; B01J 19/00; B01J 19/0013; B01D 2251/00

See application file for complete search history.

(56) References Cited

U.S. PATENT DOCUMENTS

| | | |
|---|---|---|
| 7,640,896 B2 | 1/2010 | Nazri |
| 8,916,493 B2 | 12/2014 | Quaade et al. |
| 9,889,403 B2 | 2/2018 | Christensen et al. |
| 2008/0149493 A1 | 6/2008 | Friesen et al. |
| 2010/0050615 A1 | 3/2010 | Johannessen et al. |
| 2011/0177407 A1 | 7/2011 | Majima et al. |
| 2014/0158548 A1 | 6/2014 | Botte |
| 2017/0122173 A1 | 5/2017 | Skulason |
| 2019/0161876 A1* | 5/2019 | Schmid ................. C25B 11/051 |

FOREIGN PATENT DOCUMENTS

| | | | | |
|---|---|---|---|---|
| CN | 112 174 166 A | * | 1/2021 | ............. C01C 1/026 |
| KR | 2022 0131726 A | * | 9/2022 | ............ C01C 1/0411 |

OTHER PUBLICATIONS

International Search Report dated Jan. 12, 2022, issued in International Application No. PCT/US2021/045545.
The Written Opinion of the International Searching Authority dated Jan. 12, 2022, issued in International Application No. PCT/US2021/045545.

(Continued)

*Primary Examiner* — Timothy C Vanoy
(74) *Attorney, Agent, or Firm* — Honigman LLP

(57) ABSTRACT

A system and method of generating ammonia can include an acid and an ammonia precursor.

19 Claims, 26 Drawing Sheets

(56) References Cited

OTHER PUBLICATIONS

Zhong, Y. et al. "Transition Metal Carbides and Nitrides in Energy Storage and Conversion." Advanced Science 3 (2016): n. pag. doi: 10.1002/advs.201500286.
Salamat, A. et al. "Nitrogen-rich transition metal nitrides." Coordination Chemistry Reviews 257 (2013): 2063-2072. DOI:10.1016/J.CCR.2013.01.010.
Michalsky, R. et al. "Chemical looping of metal nitride catalysts: low-pressure ammonia synthesis for energy storage." Chemical science vol. 6,7 (2015): 3965-3974. doi:10.1039/c5sc00789e.
Johannessen, T. "3rd Generation SCR System Using Solid Amonia Storage and Direct Gas Dosing:—Expanding the SCR window for RDE." 2012 Directions in Engine-Efficiency and Emissions Research (DEER) Conference Presentations.

\* cited by examiner

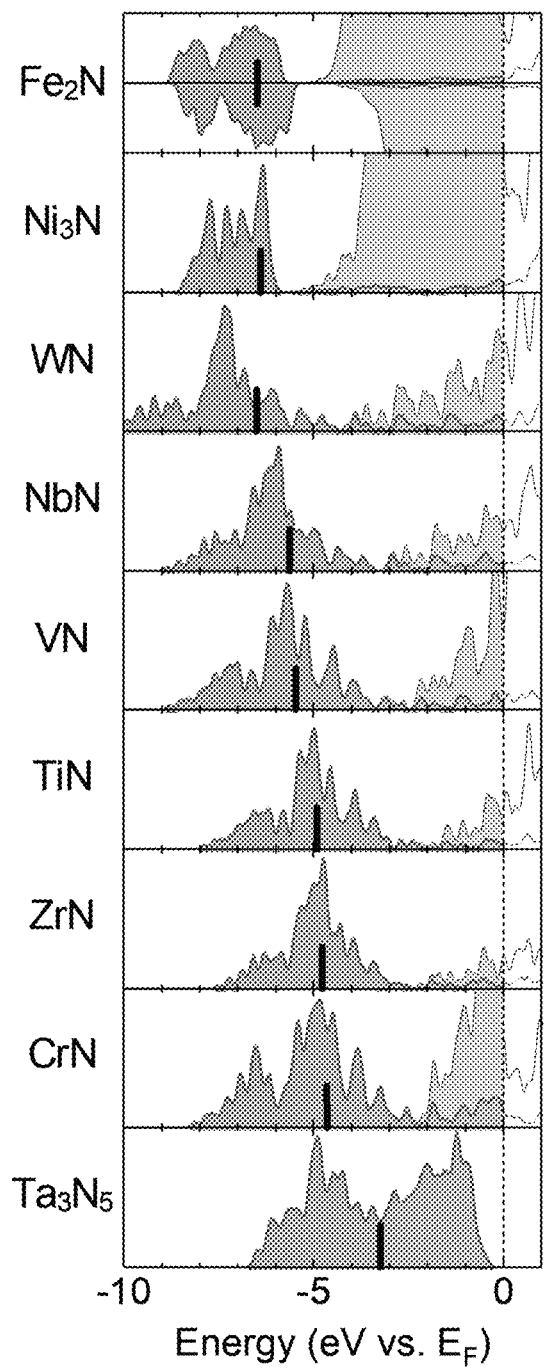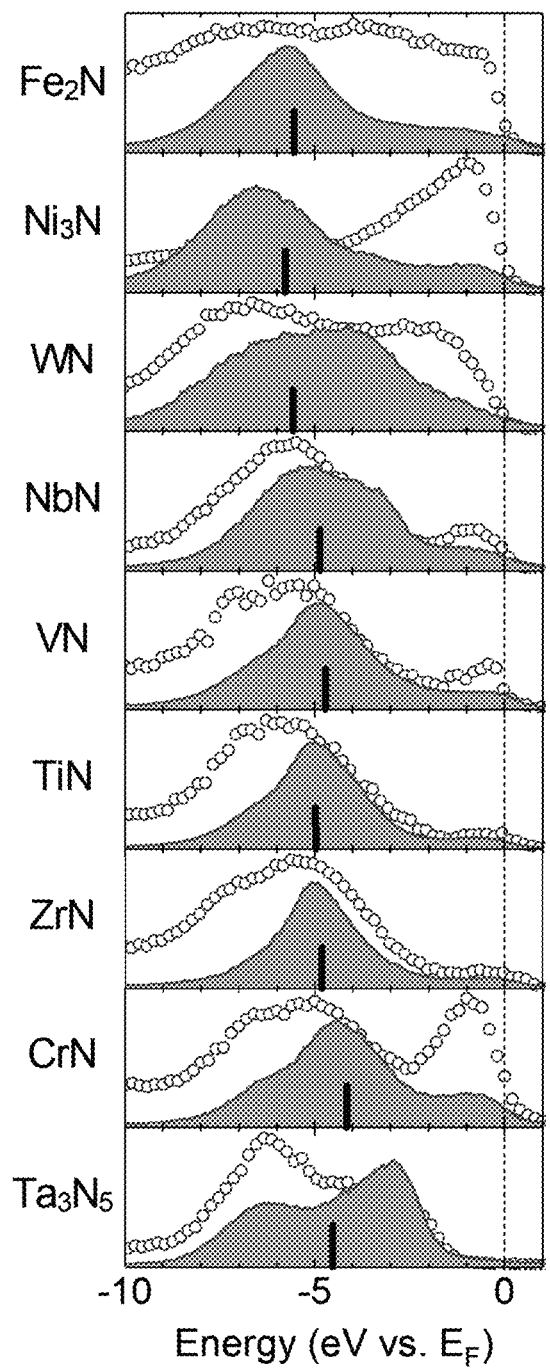
FIG. 2B  FIG. 2C

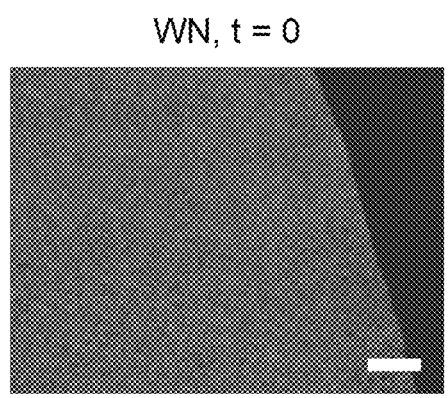 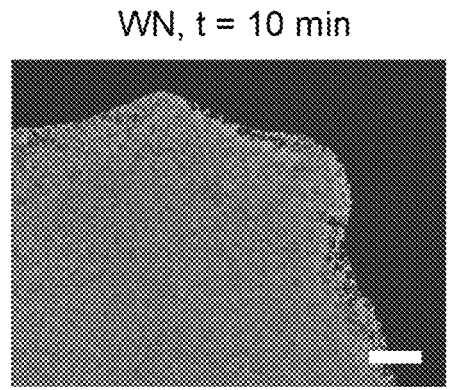 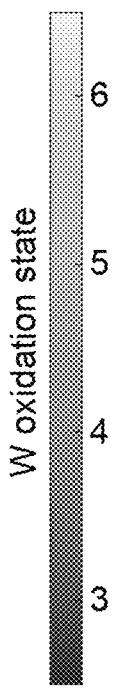
FIG. 3D         FIG. 3E
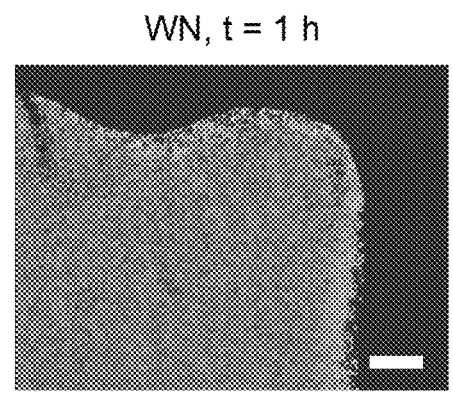 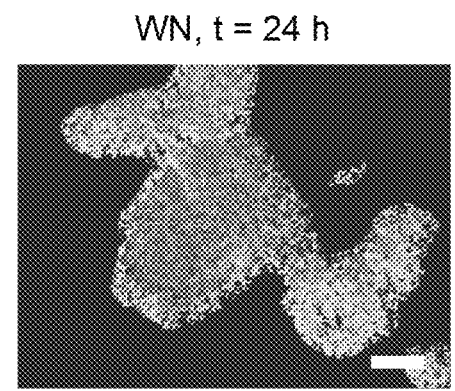 
FIG. 3F         FIG. 3G

TRANSITION METAL NITRIDES AS SOLID CARRIERS FOR AMMONIA STORAGE

CLAIM OF PRIORITY

This application claims priority to U.S. Provisional Application No. 63/065,394, filed Aug. 13, 2020, which is incorporated by reference in its entirety.

TECHNICAL FIELD

This invention relates to systems and methods for ammonia generation.

BACKGROUND

Ammonia is one of the largest-volume industrial chemicals, and is widely used as a key industrial intermediate for the production of fertilizers, plastics, explosives, nitric acid and pharmaceuticals. See, for example, Erisman, J. W., Sutton, M. A., Galloway, J., Klimont, Z. & Winiwarter, W. How a century of ammonia synthesis changed the world. *Nat. Geosci.* 1, 636-639 (2008), which is incorporated by reference in its entirety. With the availability of low-cost electrons from solar and wind, ammonia is also considered as a potential energy carrier by storing electrons in hydrogen fixed on nitrogen (in $NH_3$), which can be used to power combustion engines and fuel cells. See, Guo, J. & Chen, P. Catalyst: NH3 as an energy carrier. *Chem* 3, 709-712 (2017); and Jiao, F. & Xu, B. Electrochemical ammonia synthesis and ammonia fuel cells. *Adv. Mater.* 31, 1805173 (2019), each of which is incorporated by reference in its entirety.

SUMMARY

In one aspect, a method of generating ammonia can include providing an ammonia precursor including a $d^6$-$d^8$ transition metal nitride, and exposing the ammonia precursor to an acid to generate ammonia.

In another aspect, an ammonia generator can include a reaction chamber including an ammonia precursor, an acid source adjacent to the reaction chamber, and an acid delivery device configured to transport an acid from the acid source to the reaction chamber.

In certain circumstances, the ammonia precursor can include an iron nitride or a nickel nitride, for example, $Fe_2N$ or $Ni_3N$.

In certain circumstances, the $d^6$-$d^8$ transition metal nitride can be an iron nitride or nickel nitride.

In certain circumstances, the ammonia precursor can be exposed to the acid at a temperature of less than 100 degrees C.

In certain circumstances, the ammonia precursor can be exposed to the acid at a pressure of less than 2 atmospheres.

In certain circumstances, the acid can be an aqueous acid. For example, the acid can include sulfuric acid, phosphoric acid, or perchloric acid.

In certain circumstances, the ammonia precursor can include $Fe_2N$ or $Ni_3N$ and the acid can include sulfuric acid.

In certain circumstances, the method can include recovering the ammonia as $NH_3$ or $NH_4^+$.

In certain circumstances, the method can include controlling an amount of acid to control an amount of ammonia generated.

In certain circumstances, the method can include recovering a transition metal ion released by the ammonia precursor.

In certain circumstances, the ammonia generator can include a temperature controller.

Other aspects, embodiments, and features will be apparent from the following description, the drawings, and the claims.

BRIEF DESCRIPTION OF THE DRAWINGS

FIG. 1A shows ammonia yields and dissolved metal ion concentrations of nine transition metal nitrides after 24 hours in 0.1 M $H_2SO_4$ solutions. The conversion rates were calculated assuming nominal compositions, and the slightly higher metal yields than ammonia yields for $Fe_2N$ and $Ni_3N$ are likely due to small nitrogen nonstoichiometries, which can originate from their low formation barriers of bulk nitrogen vacancies (FIG. 2F). See, for example, Eck, B., Dronskowski, R., Takahashi, M. & Kikkawa, S. Theoretical calculations on the structures, electronic and magnetic properties of binary 3d transition metal nitrides. *J. Mater. Chem.* 9, 1527-1537 (1999), which is incorporated by reference in its entirety. Error bars represent s.d. from three independent measurements. Details about quantification are shown in FIGS. 9-13. FIG. 1B shows time-dependent ammonia formation profiles of transition metal nitrides in 0.1 M $H_2SO_4$. The initial rates can be obtained via fitting data points to first-order kinetic model (FIG. 14) and normalized by the Brunauer-Emmett-Teller (BET) surface areas of nitrides (Table 2).

FIGS. 2A-2F depict nitrogen 2p band centers as descriptor for the protonation of metal nitrides in acid. FIG. 2A shows electronic structures of transition metal nitrides represented by DOS, and COHP as the bonding indicator with implications on metal-nitrogen bond strength, which can be estimated by the filling of antibonding orbitals, calculated via normalizing the integrated COHP to the Fermi levels ($iCOHP_{Fermi}$) by the maximum integrated COHP values that correspond to fully empty anti-bonding metal d orbitals ($iCOHP_{max}$). FIG. 2B shows metal d (purple) and nitrogen 2p (green) projected DOS of nitrides. FIG. 2C shows alignment of N Kα XES spectra (green) with valence band XPS spectra (dots) to obtain the experimental nitrogen DOS relative to the Fermi levels. In FIGS. 2B and 2C, the dashed lines indicate the Fermi levels, and the black bars denote the positions of nitrogen 2p band centers, determined by taking the centroid of the occupied nitrogen DOS. Comparison of the DFT and XES band centers is shown in FIG. 18. FIGS. 2D-2E show trends in the ammonia yields after 24 hours (red) and the initial ammonia formation rates (black) in 0.1 M $H_2SO_4$ solutions, as a function of DFT (FIG. 2D) and XES (FIG. 2E) nitrogen 2p band centers relative to the Fermi levels. Error bars in the ammonia yields represent s.d. from three independent measurements. Error bars in XES band centers represent the errors in spectral alignment (~0.5 eV). See, for example, Hong, W. T. et al. Charge-transfer-energy-dependent oxygen evolution reaction mechanisms for perovskite oxides. Energy Environ. Sci. 10, 2190-2200 (2017), which is incorporated by reference in its entirety. FIG. 2F shows dependence of the filling of antibonding orbitals ($iCOHP_{Fermi}/iCOHP_{max}$) and the energetic barriers for the creation of bulk nitrogen vacancies ($\Delta G_{N_{vac}}$, relative to $NH_4^+$) on the DFT nitrogen 2p band centers ($\varepsilon_{N,2p}$).

FIGS. 3A-3G depict the influence of the solubility of metal ions on the nitride protonation kinetics. FIG. 3A shows a PXRD patterns of WN before and after protonation. The major peaks can be assigned to the cubic rocksalt WN phase (Fm$\bar{3}$m, a=0.41 nm, FIGS. 4 and 5). The secondary phase highlighted by the blue peaks matches with the standard pattern of orthorhombic WO$_3$·H$_2$O (ICDD #01-084-0886). FIG. 3B shows W 4f XPS spectra of WN before and after protonation. The two sets of 4f$_{7/2}$ and 4f$_{5/2}$ doublets from low to high binding energy correspond to W$^{3+}$ and W$^{6+}$, respectively. FIG. 3C shows W L-edge XANES spectra of WN before and after protonation. FIGS. 3D-3G show 2D W oxidation state mapping of WN before (FIG. 3D) and after protonation for 10 min (FIG. 3E), 1 h (FIG. 3F) and 24 h (FIG. 3G). Scale bar: 1 µm. Colorbar indicates the W oxidation states.

DETAILED DESCRIPTION

Figure 1A:
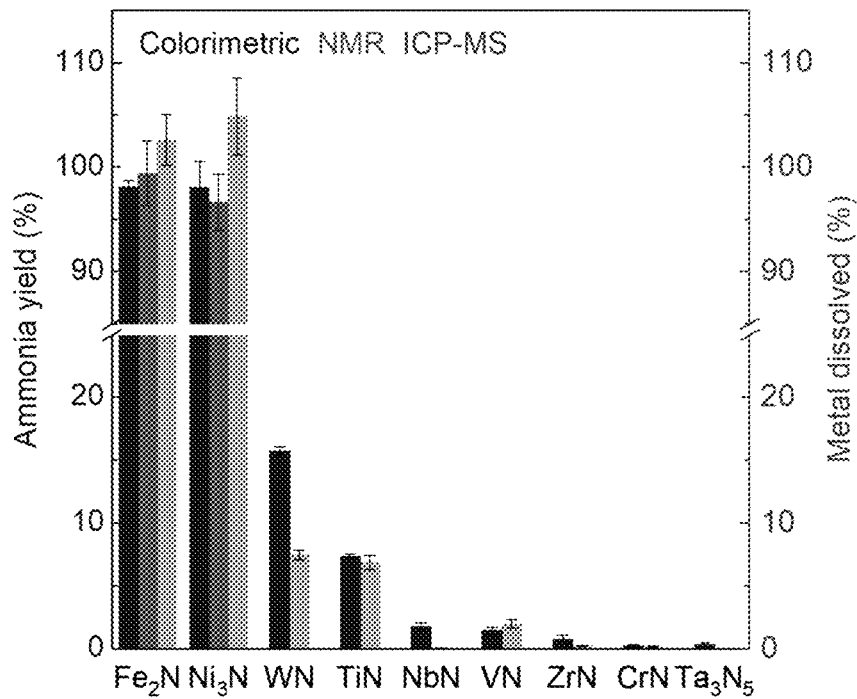
FIGS. 1A-1B depict. ammonia formation yields and metal nitride protonation kinetics in acidic solutions.

Ammonia can be generated directly from an ammonia precursor including a metal nitride by contacting the metal nitride with an acid. The approach to generating ammonia in this way, particularly from an iron nitride or nickel nitride can allow for controlled generation of ammonia under mild or ambient conditions. The ammonia can be generated in a controlled environment. For example, an acid can be delivered to a chamber in contact with the ammonia precursor at a rate that correlates with a desired rate of ammonia generation. The acid can be delivered in pulsed batches or continuously. The acid can be in a solution with a known concentration, which in turn can provide control over the rate of ammonia generation. The ammonia precursor can be a solid.

The current centralized ammonia production networks require a stable vector for ammonia distribution and storage. Using a solid vector can greatly reduce the inefficiencies and costs of these networks and eliminate safety hazards. Although a few materials systems based on chemisorption have been developed for solid ammonia storage, they are generally difficult to synthesize at large scales and/or the ammonia release can proceed at acceptable rates only at high temperatures. See, for example, Christensen, C. H. et al. Metal ammine complexes for hydrogen storage. *J. Mater. Chem.* 15, 4106-4108 (2005); Sorensen, R. Z. et al. Indirect, reversible high-density hydrogen storage in compact metal ammine salts. *J. Am. Chem. Soc.* 130, 8660-8668 (2008); Johnson, S. R. et al. The monoammoniate of lithium borohydride, Li(NH3)BH4: an effective ammonia storage compound. *Chem. Asian J.* 4, 849-854 (2009); Pontiroli, D. et al. Ammonia-storage in lithium intercalated fullerides. *J. Mater. Chem. A* 3, 21099-21105 (2015); Rieth, A. J., Tulchinsky, Y. & Dincă, M. High and reversible ammonia uptake in mesoporous azolate metal-organic frameworks with open Mn, Co, and Ni sites. *J. Am. Chem. Soc.* 138, 9401-9404 (2016); and Doonan, C. J., Tranchemontagne, D. J., Glover, T. G., Hunt, J. R. & Yaghi, O. M. Exceptional ammonia uptake by a covalent organic framework. *Nat. Chem.* 2, 235-238 (2010), each of which is incorporated by reference in its entirety. As described herein, it is demonstrated that transition metal nitrides can be ideal solid vectors for ammonia storage and release at mild conditions. Specifically, protonation of air-stable $Fe_2N$ and $Ni_3N$ in acid at room temperature can produce ammonia within minutes with ~100% yields of nitrogen. The high yields and fast ammonia formation kinetics of $Fe_2N$ and $Ni_3N$ can be rationalized by their weak metal-nitrogen bond strength and large thermodynamic driving force for the creation of nitrogen vacancies, dictated by their low nitrogen 2p bands relative the Fermi levels, as well as the high solubility of metal ions in acidic conditions. As discussed herein, nitrides can be as the next-generation ammonia transport vectors, and provides design principles for regulating the stability of metal nitrides for acidic applications.

The industrial production of ammonia is highly centralized via the Haber-Bosch process, which requires high temperatures (~700 K) and pressures (~100 atm), and is only efficient and economically viable at large scales. See, for example, Chen, J. G. et al. Beyond fossil fuel-driven nitrogen transformations. *Science* 360, eaar6611 (2018); and Foster, S. L. et al. Catalysts for nitrogen reduction to ammonia. *Nat. Catal.* 1, 490-500 (2018), each of which is incorporated by reference in its entirety. Therefore, ammonia storage and transport play a critical role in delivering ammonia from central Haber-Bosch plants to end users at diverse and often distant locations. See, for example, Valera-Medina, A., Xiao, H., Owen-Jones, M., David, W. I. F. & Bowen, P. J. Ammonia for power. Prog. Energy Combust. Sci. 69, 63-102 (2018), which is incorporated by reference in its entirety. Unfortunately, the toxicity, corrosiveness, and high vapor pressure of ammonia present significant safety hazards, and can lead to considerable loss of ammonia (~40%) in storage, transport and use (e.g. fertilizers), as well as severe environmental issues such as eutrophication. See, for example, Doonan, C. J., Tranchemontagne, D. J., Glover, T. G., Hunt, J. R. & Yaghi, O. M. Exceptional ammonia uptake by a covalent organic framework. *Nat. Chem.* 2, 235-238 (2010); Klerke, A., Christensen, C. H., Nørskov, J. K. & Vegge, T. Ammonia for hydrogen storage: challenges and opportunities. *J. Mater. Chem.* 18, 2304-2310 (2008); and Fowler, D. et al. The global nitrogen cycle in the twenty-first century. *Philos. Trans. R. Soc. B Biol. Sci.* 368, 20130164 (2013), each of which is incorporated by reference in its entirety. Such challenges have motivated many recent efforts in distributed ammonia production, which has been reported using molecular catalysts (e.g. nitrogenase mimics), electrochemical methods (e.g. electrocatalytic, lithium-mediated, and electrolytic using plasma or in ionic liquid), and chemical, photochemical or thermochemical looping. See, for example, Chen, J. G. et al. Beyond fossil fuel-driven nitrogen transformations. *Science* 360, eaar6611 (2018); Foster, S. L. et al. Catalysts for nitrogen reduction to ammonia. *Nat. Catal.* 1, 490-500 (2018); Andersen, S. Z. et al. A rigorous electrochemical ammonia synthesis protocol with quantitative isotope measurements. *Nature* 570, 504-508 (2019); McEnaney, J. M. et al. Ammonia synthesis from $N_2$ and $H_2O$ using a lithium cycling electrification strategy at atmospheric pressure. *Energy Environ. Sci.* 10, 1621-1630 (2017); Hawtof, R. et al. Catalyst-free, highly selective synthesis of ammonia from nitrogen and water by a plasma electrolytic system. *Sci. Adv.* 5, eaat5778 (2019); Zhou, F. et al. Electro-synthesis of ammonia from nitrogen at ambient temperature and pressure in ionic liquids. *Energy Environ. Sci.* 10, 2516-2520 (2017); Gao, W. et al. Production of ammonia via a chemical looping process based on metal imides as nitrogen carriers. Nat. Energy 3, 1067-1075 (2018); Swearer, D. F., Knowles, N. R., Everitt, H. O. & Halas, N. J. Light-driven chemical looping for ammonia synthesis. *ACS Energy Lett.* 4, 1505-1512 (2019); and Michalsky, R., Avram, A. M., Peterson, B. A., Pfromm, P. H. & Peterson, A. A. Chemical looping of metal nitride catalysts: Low-pressure ammonia synthesis for energy storage. *Chem. Sci.* 6, 3965-3974 (2015), each of which is incorporated by reference in its entirety. However, these methods typically have high costs, low energy efficiency, and/or poor specificity towards nitrogen fixation, and it was predicted that they can hardly be commercialized within the next twenty years. See, for example, Jiao, F. & Xu, B. Electrochemical ammonia synthesis and ammonia fuel cells. *Adv. Mater.* 31, 1805173 (2019); Foster, S. L. et al. Catalysts for nitrogen reduction to ammonia. *Nat. Catal.* 1, 490-500 (2018); Suryanto, B. H. R. et al. Challenges and prospects in the catalysis of electroreduction of nitrogen to ammonia. *Nat. Catal.* 2, 290-296 (2019); Singh, A. R. et al. Electrochemical ammonia synthesis—the selectivity challenge. *ACS Catal.* 7, 706-709 (2017); MacFarlane, D. R. et al. A roadmap to the ammonia economy. *Joule* (2020) doi: 10.1016/j.joule.2020.04.004, each of which is incorporated by reference in its entirety.

Storing ammonia using solid vectors can overcome the inefficiencies, reduce losses and eliminate safety and environmental hazards within the current centralized ammonia utilization networks. See, for example, Pontiroli, D. et al. Ammonia-storage in lithium intercalated fullerides. *J. Mater. Chem. A* 3, 21099-21105 (2015); and Klerke, A., Christensen, C. H., Nørskov, J. K. & Vegge, T. Ammonia for hydrogen storage: challenges and opportunities. *J. Mater. Chem.* 18, 2304-2310 (2008), each of which is incorporated by reference in its entirety. While a number of materials systems have been reported for the uptake of ammonia, ammonia is typically stored via chemisorption and thus ammonia release through desorption generally requires high temperatures. See, for example, Lan, R., Irvine, J. T. S. & Tao, S. Ammonia and related chemicals as potential indirect hydrogen storage materials. *Int. J. Hydrog. Energy* 37, 1482-1494 (2012), For example, ammonia can be stored in metal ammine complexes by reacting with metal chloride salts, where the full release of ammonia from these complexes requires high temperatures (e.g. up to 620 K), while reducing the release temperature by metal substitution leads to higher vapor pressure and thus poorer stability. See, for example, Christensen, C. H. et al. Metal amine complexes for hydrogen storage. *J. Mater. Chem.* 15, 4106-4108 (2005); and Sorensen, R. Z. et al. Indirect, reversible high-density hydrogen storage in compact metal ammine salts. *J. Am. Chem. Soc.* 130, 8660-8668 (2008), each of which is incorporated by reference in its entirety. In addition, lithium borohydrides can react with ammonia to form stable ammoniates, but the release of ammonia is not reversible due to formation of both ammonia and H2. See, for example, Johnson, S. R. et al. The monoammoniate of lithium borohydride, Li(NH$_3$)BH4: an effective ammonia storage compound. *Chem. Asian J.* 4, 849-854 (2009); and Pontiroli, D. et al. Ammonia-storage in lithium intercalated fullerides. *J. Mater. Chem. A* 3, 21099-21105 (2015), each of which is incorporated by reference in its entirety. Besides, lithium intercalated fullerides and porous crystalline solids (e.g. metal organic frameworks and covalent organic frameworks), can store ammonia but they are difficult and costly to synthesize at large scales. See, for example, Pontiroli, D. et al. Ammonia-storage in lithium intercalated fullerides. *J. Mater. Chem. A* 3, 21099-21105 (2015); Rieth, A. J., Tulchinsky, Y. & Dincǎ, M. High and reversible ammonia uptake in mesoporous azolate metal-organic frameworks with open Mn, Co, and Ni sites. *J. Am. Chem. Soc.* 138, 9401-9404 (2016); and Doonan, C. J., Tranchemontagne, D. J., Glover, T. G., Hunt, J. R. & Yaghi, O. M. Exceptional ammonia uptake by a covalent organic framework. *Nat. Chem.* 2, 235-238 (2010), each of which is incorporated by reference in its entirety.

Metal nitrides, known for their facile synthesis, thermodynamic metastability and wide chemical tunability, have recently emerged as an interesting materials system with potential for solid ammonia storage. See, for example, Yang, M., MacLeod, M. J., Tessier, F. & DiSalvo, F. J. Mesoporous metal nitride materials prepared from bulk oxides. *J. Am. Ceram. Soc.* 95, 3084-3089 (2012); Sun, W. et al. The thermodynamic scale of inorganic crystalline metastability. *Sci. Adv.* 2, e1600225 (2016); DiSalvo, F. J. & Clarke, S. J. Ternary nitrides: a rapidly growing class of new materials. *Curr. Opin. Solid State Mater. Sci.* 1, 241-249 (1996); Niewa, R. & DiSalvo, F. J. Recent developments in nitride chemistry. *Chem. Mater.* 10, 2733-2752 (1998); and Sun, W. et al. A map of the inorganic ternary metal nitrides. *Nat. Mater.* 18, 732-739 (2019), each of which is incorporated by reference in its entirety. Several previous studies have reported ammonia formation through the hydrogenation or protonation of lattice nitrogen in metal nitrides. Mn$_6$N$_{2.58}$, Ca$_3$N$_2$ and Sr$_2$N can generate ammonia via hydrogenation (e.g. $2M_xN_y + 3\delta H_2 \rightarrow 2M_xN_{y-\delta} + 2\delta NH_3$) but at 550° C. and higher. See, for example, Michalsky, R., Avram, A. M., Peterson, B. A., Pfromm, P. H. & Peterson, A. A. Chemical looping of metal nitride catalysts: Low-pressure ammonia synthesis for energy storage. *Chem. Sci.* 6, 3965-3974 (2015), which is incorporated by reference in its entirety. In contrast, ammonia can be produced at room temperature through the hydrolysis of Li$_3$N and Mg$_3$N$_2$, but the kinetics are too fast to control, and these nitrides are too reactive with oxygen and moisture to be stable in air for ammonia storage. See, for example, McEnaney, J. M. et al. Ammonia synthesis from N$_2$ and H$_2$O using a lithium cycling electrification strategy at atmospheric pressure. *Energy Environ. Sci.* 10, 1621-1630 (2017); and Swearer, D. F., Knowles, N. R., Everitt, H. O. & Halas, N. J. Light-driven chemical looping for ammonia synthesis. *ACS Energy Lett.* 4, 1505-1512 (2019), each of which is incorporated by reference in its entirety. Moreover, VN and Mo$_2$N, previously experimentally reported as catalysts for electrochemical N$_2$ reduction to ammonia, were later found to be catalytically inactive and the detected ammonia was hypothesized to originate from the decomposition of these nitrides. See, for example, Zhang, X., Kong, R.-M., Du, H., Xia, L. & Qu, F. Highly efficient electrochemical ammonia synthesis via nitrogen reduction reactions on a VN nanowire array under ambient conditions. *Chem. Commun.* 54, 5323-5325 (2018); Ren, X. et al. Electrochemical N$_2$ fixation to NH$_3$ under ambient conditions: Mo$_2$N nanorod as a highly efficient and selective catalyst. *Chem. Commun.* 54, 8474-8477 (2018); Zhang, R. et al. High-efficiency electrosynthesis of ammonia with high selectivity under ambient conditions enabled by VN nanosheet array. *ACS Sustain. Chem. Eng.* 6, 9545-9549 (2018); Du, H. L., Gengenbach, T. R., Hodgetts, R., MacFarlane, D. R. & Simonov, A. N. Critical assessment of the electrocatalytic activity of vanadium and niobium nitrides toward dinitrogen reduction to ammonia. *ACS Sustain. Chem. Eng.* 7, 6839-6850 (2019); Hu, B., Hu, M., Seefeldt, L. & Liu, T. L. Electrochemical dinitrogen reduction to ammonia by Mo$_2$N: catalysis or decomposition? *ACS Energy Lett.* 4, 1053-1054 (2019); and Manjunatha, R., Karajić, A., Teller, H., Nicoara, K. & Schechter, A. Electrochemical and chemical instability of vanadium nitride in the synthesis of ammonia directly from nitrogen. *Chem Cat Chem* 12, 438-443 (2020), each of which is incorporated by reference in its entirety. Thus, metal nitrides can be promising for ammonia storage and fast release at mild conditions via the protonation of lattice nitrogen, where fundamental understanding is still needed to establish design principles to regulate the kinetics for making ammonia from nitrides.

An ammonia precursor can liberate ammonia upon contact with an acid. The ammonia precursor can include a metal nitride, for example, a $d^6$-$d^8$ transition metal nitride. The ammonia precursor can include an inert carrier. The inert carrier can be a metal oxide or a metal carbide powder, or mixture thereof, that does not react with acid.

The reaction to release the ammonia from the ammonia precursor can take place at a relatively low temperature, for example, at a temperature of less than 100 degrees C., less than 95 degrees C., less than 90 degrees C., less than 85 degrees C., less than 80 degrees C., less than 75 degrees C., less than 70 degrees C., less than 65 degrees C., less than 60 degrees C., less than 55 degrees C., or less than 50 degrees C. In certain circumstances, the reaction can take place at room temperature.

The reaction to release the ammonia from the ammonia precursor can take place at a relatively low pressure, for example, at a pressure of less than 5 atmospheres, less than 3 atmospheres, less than 2 atmospheres, or around 1 atmosphere. In certain circumstances, the pressure can be less than one atmosphere. Advantageously, the generation or release of ammonia does not require extremely elevated temperatures or pressures.

The $d^6$-$d^8$ transition metal nitride can include an iron nitride, cobalt nitride, nickel nitride, ruthenium nitride, or osmium nitride. The $d^6$-$d^8$ transition metal nitride can be doped or undoped. The $d^6$-$d^8$ transition metal nitride can be a binary or ternary nitride. In certain circumstances, the $d^6$-$d^8$ transition metal nitride can include Fe$_2$N or Ni$_3$N.

The acid can be a strong acid. For example, the acid can include chloric acid, hydrobromic acid, hydrochloric acid, hydroiodic acid, nitric acid, perchloric acid, phosphoric acid, or sulfuric acid. In certain circumstances, the acid can include perchloric acid, phosphoric acid, or sulfuric acid.

The acid can be an aqueous acid. The acid concentration can be between 0.01 M and 5 M, for example, between 0.05 M and 2 M. In certain circumstances, the acid concentration can be 0.1 M to 0.5 M.

As described herein, a method of generating ammonia can include providing an ammonia precursor and exposing the ammonia precursor to an acid to generate ammonia. The method can include controlling an amount of acid to control an amount of ammonia generated. The conversion of the ammonia precursor to ammonia can be nearly qualitative, or predetermined, thereby allowing the amount of ammonia that is generated to be controlled.

The method can include recovering the ammonia as ammonia gas ($NH_3$) or ammonium ($NH_4^+$). For example, ammonium can be recovered as a salt.

The method can also include recovering a transition metal ion released by the ammonia precursor. For example, the transition metal ion can be recovered by precipitation, for example, as an oxide or hydroxide or other solid.

Figure 24:
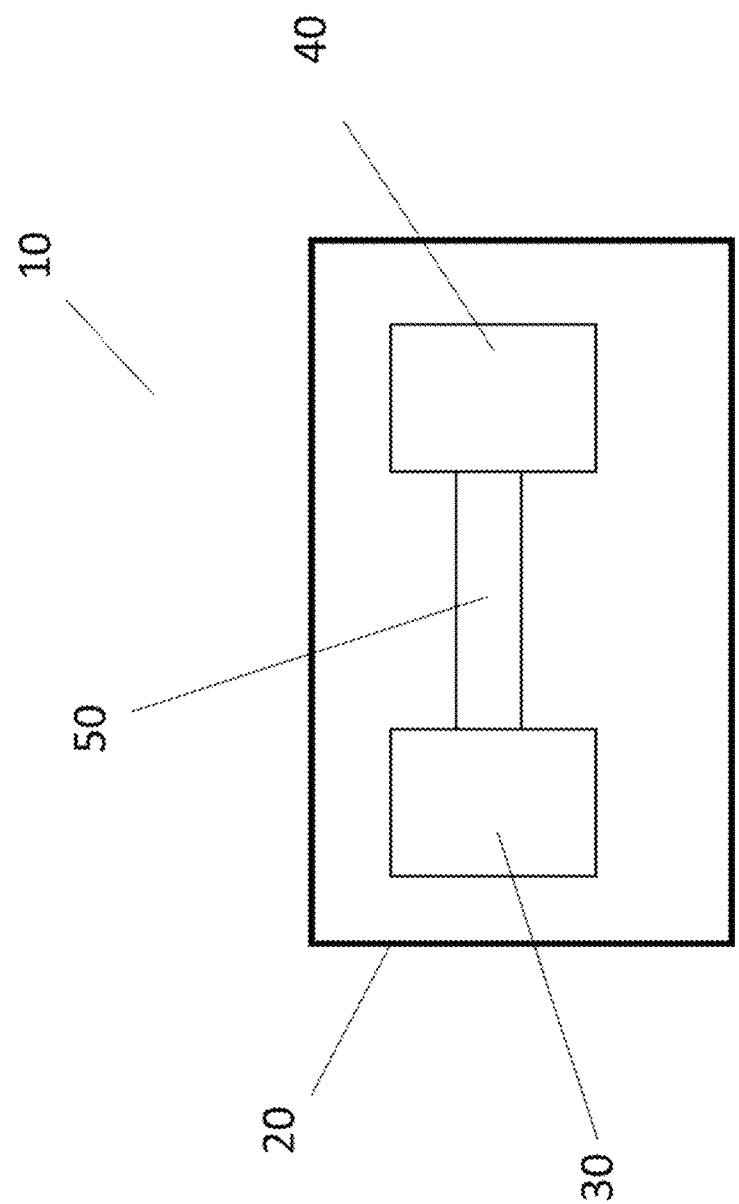
FIG. 24 depicts a schematic of an ammonia generator.

In another aspect, an ammonia generator can include a reaction chamber including an ammonia precursor, an acid source adjacent to the reaction chamber, and an acid delivery device configured to transport an acid from the acid source to the reaction chamber. As shown in FIG. 24, ammonia generator 10 can include a housing 20. The housing 20 can contain reaction chamber 30 and acid source 40. Acid delivery device 50 can introduce acid to the reaction chamber. For example, acid delivery device can be a pump, syringe pump, or other fluid delivery device. The housing can include a temperature controller (not shown) to regulate the reaction conditions within the reaction chamber. The housing can include a pressure controller (not shown) to regulate the pressure within the reaction chamber.

Figure 4:
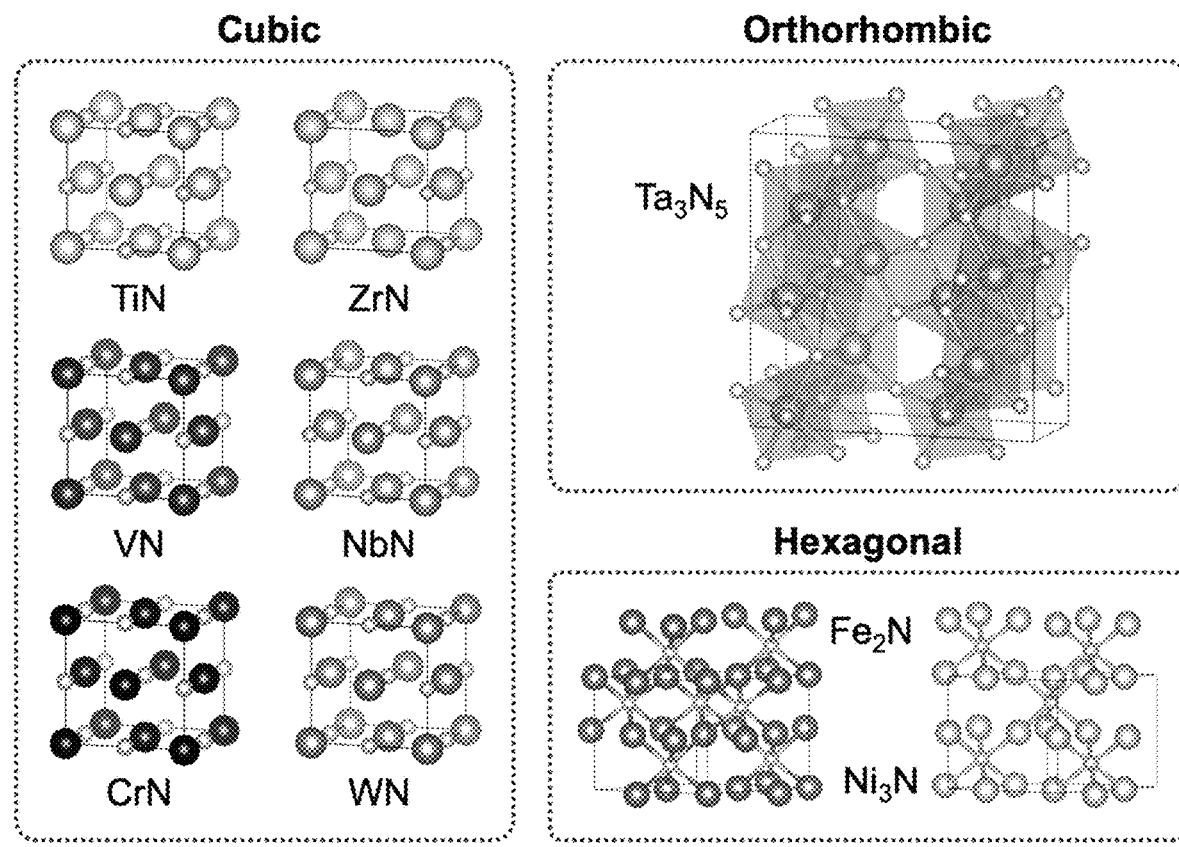
FIG. 4 depicts an illustration of the crystal structures of all transition metal nitrides in this study. TiN, VN, CrN, ZrN, NbN and WN have cubic rocksalt structures with space group Fm$\bar{3}$m. Ta$_3$N$_5$ has an orthorhombic structure with space group Cmcm, and is composed of edge-sharing irregular TaN$_6$ octahedra. Each Ta atom is coordinated by two N atoms that are 3-fold coordinated and four N atoms that are 4-fold coordinated. Fe$_2$N and Ni$_3$N have hexagonal structures with group P$\bar{3}$1m and P6$_3$22, respectively. In both structures, each N atom is coordinated by six metal ions in distorted octahedral configuration. The metal ions are three-fold and two-fold coordinated by N atoms in Fe$_2$N and Ni$_3$N, respectively.
Figure 5:
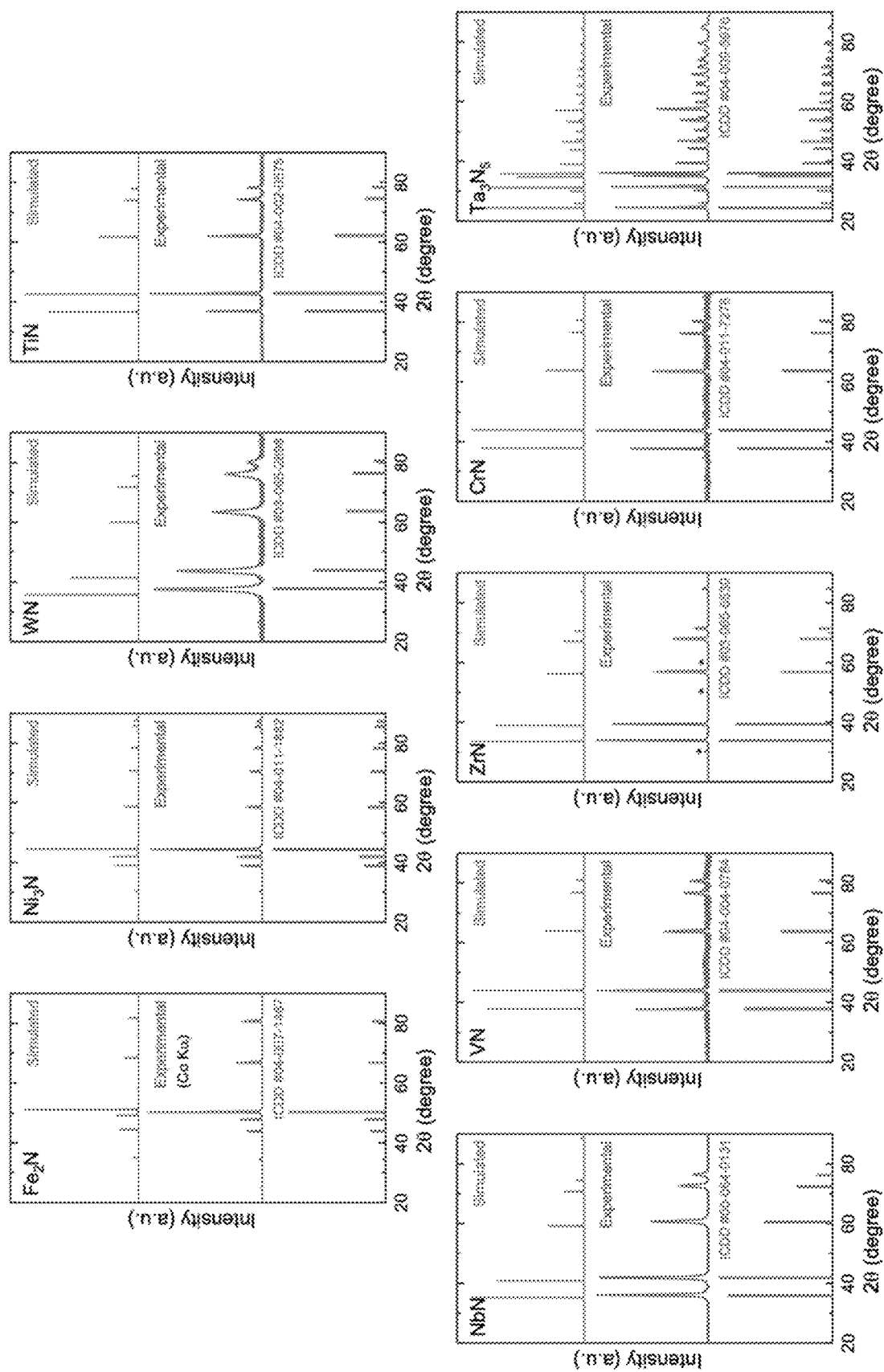
FIG. 5 depicts a powder X-ray diffraction (PXRD) spectra of all transition metal nitrides in this study. All spectra were collected for powder samples in a step scan mode with a step size of 0.02°, a step time of 1 second per step, and a scan range from 20° to 90°. The PXRD pattern of Fe$_2$N was collected using Co X-ray source (Kα, 1.7902 Å), due to the strong fluorescence from Fe-containing samples when using Cu X-ray source (Kα, 1.5406 Å). The PXRD spectra of all nitrides match well with the standard patterns from the International Centre for Diffraction Data database as well as the simulated PXRD spectra from bulk structural models (FIG. 4). The ZrN sample has a minor ZrO$_2$ impurity (estimated content <3.7 wt. %). All other samples show phase purity within the experimental resolution of the diffractometer. The average crystalline grain sizes estimated based on Scherrer equation are summarized in Table 2.
Figure 6:
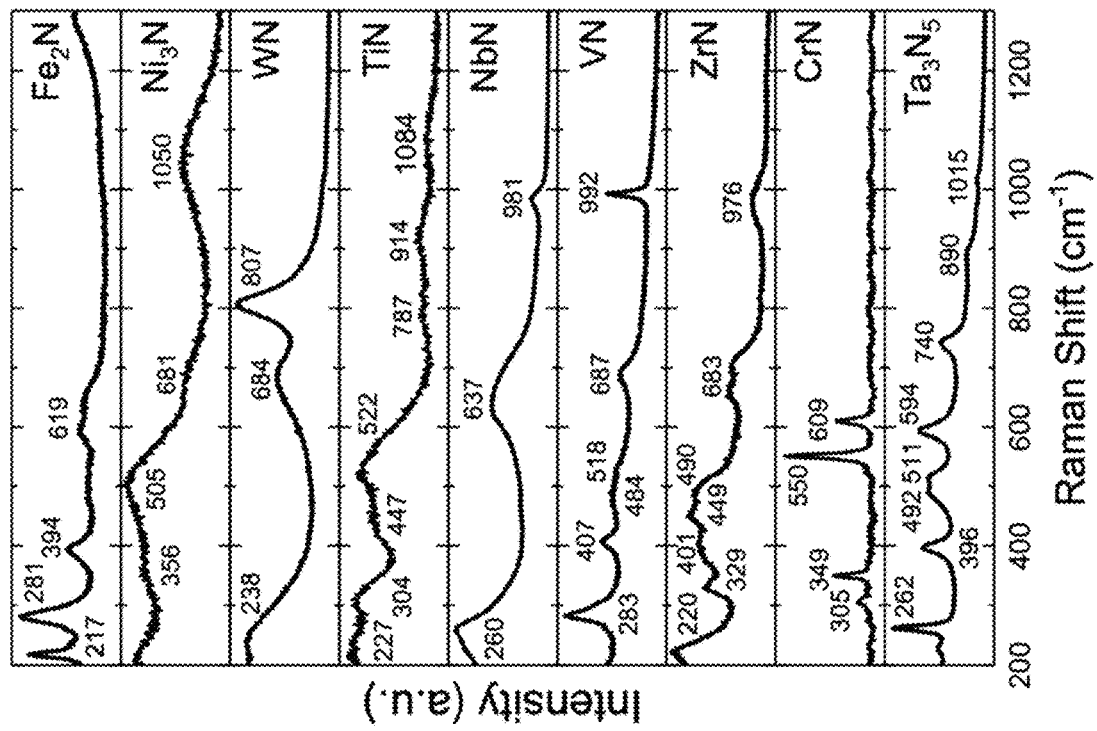
FIG. 6 depicts Raman spectra of all transition metal nitrides in this study. The Raman peaks of all nitrides match well with the spectra reported in literatures: Fe$_2$N, Ni$_3$N, WN, TiN, NbN, VN, ZrN, CrN and Ta$_3$N$_5$. See, for example, Balogun, M.-S. et al. Binder-free Fe$_2$N nanoparticles on carbon textile with high power density as novel anode for high-performance flexible lithium ion batteries. *Nano Energy* 11, 348-355 (2015); Wang, L. et al. Ion-exchanged route synthesis of Fe$_2$N—N-doped graphitic nanocarbons composite as advanced oxygen reduction electrocatalyst. *Chem. Commun.* 49, 3022-3024 (2013); Yu, P. et al. Three-dimensional Fe$_2$N@C microspheres grown on reduced graphite oxide for lithium-ion batteries and the Li storage mechanism. *Chem. Eur. J.* 21, 3249-3256 (2015); Zhu, C. et al. In situ grown epitaxial heterojunction exhibits high-performance electrocatalytic water splitting. *Adv. Mater.* 30, 1705516 (2018); Zhang, M., Qiu, Y., Han, Y., Guo, Y. & Cheng, F. Three-dimensional tungsten nitride nanowires as high performance anode material for lithium ion batteries. *J. Power Sources* 322, 163-168 (2016); Spengler, W. & Kaiser, R. First and second order Raman scattering in transition metal compounds. *Solid State Commun.* 18, 881-884 (1976); Yang, X., Li, C., Yang, L., Yan, Y. & Qian, Y. Reduction-nitridation synthesis of titanium nitride nanocrystals. *J. Am. Ceram. Soc.* 86, 206-208 (2003); Balogun, M.-S. et al. Facile synthesis of titanium nitride nanowires on carbon fabric for flexible and high-rate lithium ion batteries. *J. Mater. Chem. A* 2, 10825-10829 (2014); Begun, G. M. & Bamberger, C. E. Raman spectroscopic observation of laser-induced oxidation of transition-metal borides, carbides, and nitrides. *Appl. Spectrosc.* 43, 134-138 (1989); Wu, M. et al. Synthesis of highly effective vanadium nitride (VN) peas as a counter electrode catalyst in dye-sensitized solar cells. *J. Phys. Chem. C* 118, 12625-12631 (2014); Ghimbeu, C. M., Raymundo-Piñero, E., Fioux, P., Béguin, F. & Vix-Guterl, C. Vanadium nitride/carbon nanotube nanocomposites as electrodes for supercapacitors. *J. Mater. Chem.* 21, 13268-13275 (2011); Barshilia, H. C. & Rajam, K. S. Raman spectroscopy studies on the thermal stability of TiN, CrN, TiAlN coatings and nanolayered TiN/CrN, TiAlN/CrN multilayer coatings. *J. Mater. Res.* 19, 3196-3205 (2004); Qi, Z. B. et al. A comparative study of the oxidation behavior of Cr2N and CrN coatings. *Thin Solid Films* 544, 515-520 (2013); Nurlaela, E., Ould-Chikh, S., Llorens, I., Hazemann, J.-L. & Takanabe, K. Establishing efficient cobalt-based catalytic sites for oxygen evolution on a Ta3N5 photocatalyst. *Chem. Mater.* 27, 5685-5694 (2015); and Fu, G., Yan, S., Yu, T. & Zou, Z. Oxygen related recombination defects in Ta3N5 water splitting photoanode. *Appl. Phys. Lett.* 107, 171902 (2015), each of which is incorporated by reference in its entirety.
Figure 7:
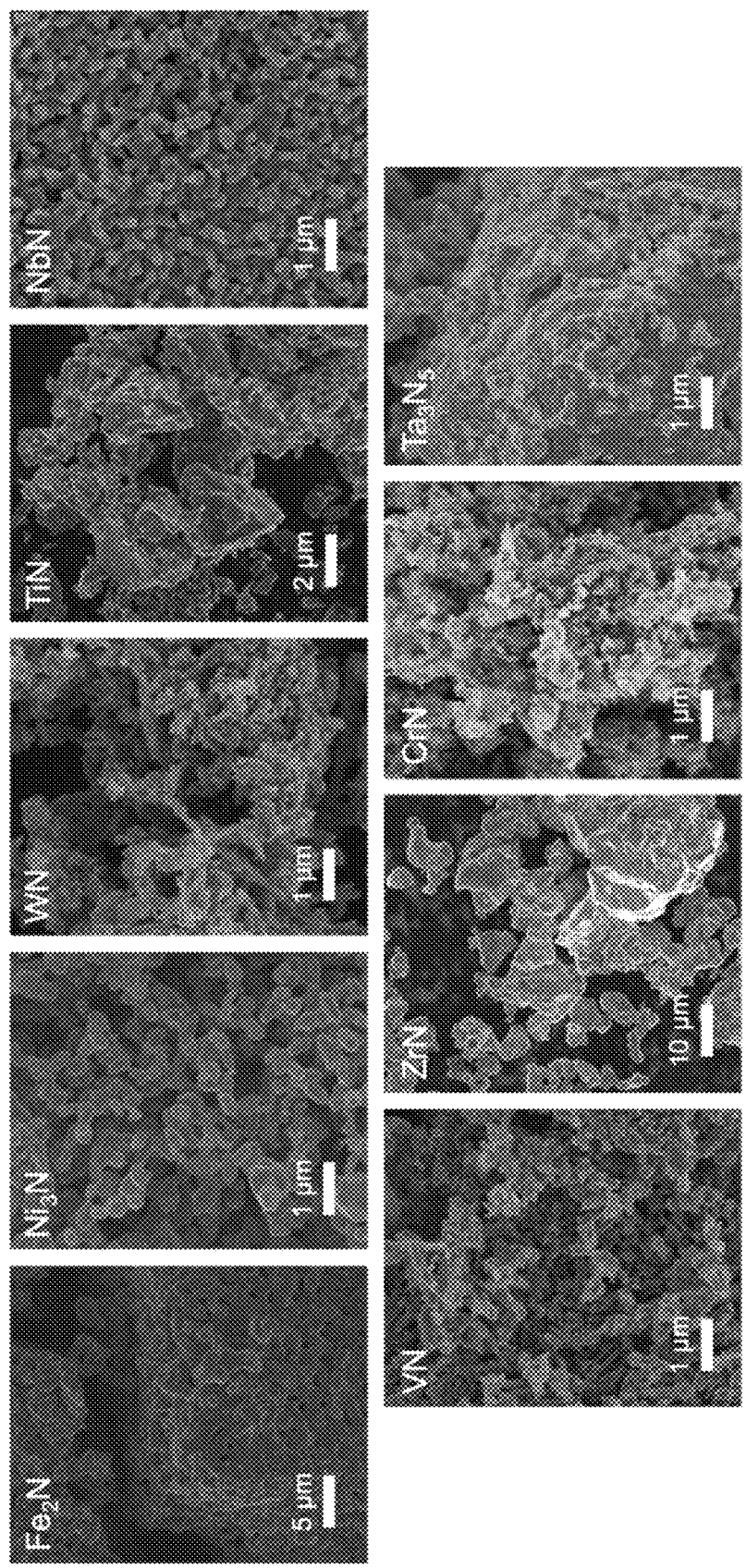
FIG. 7 depicts scanning electron microscopy images of all metal nitrides in this study. The porous morphology evolved from sintering during solid-state synthesis.
Figure 8:
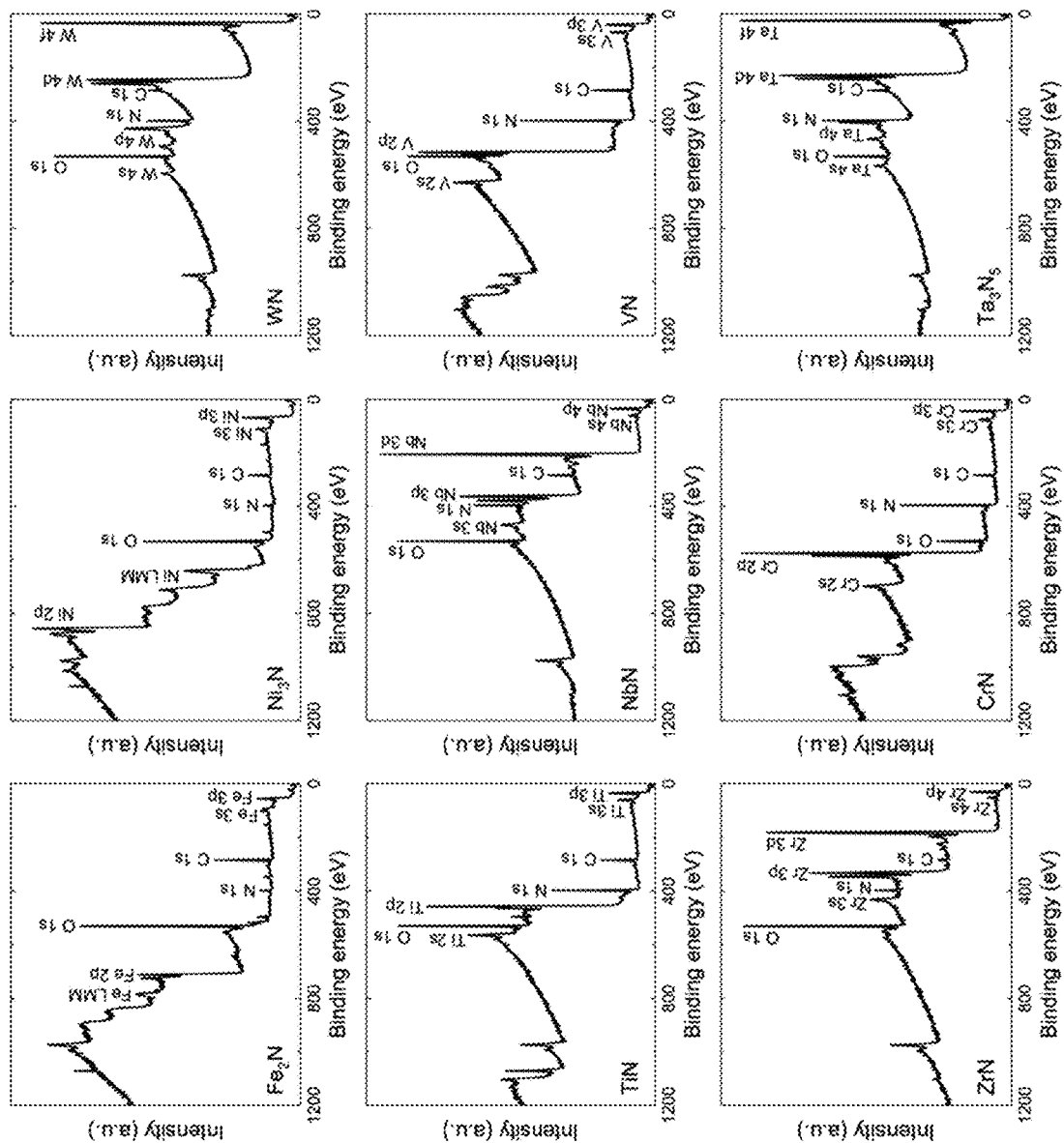
FIG. 8 depicts X-ray photoelectron spectroscopy (XPS) survey spectra of all metal nitrides in this study. The coexistence of O 1s and N 1s peaks indicates the thin surface oxynitride layers.

Herein, a library of transition metal nitrides (i.e. TiN, VN, CrN, ZrN, NbN, WN, $Ta_3N_5$, $Fe_2N$ and $Ni_3N$, FIG. 4) was examined and search for descriptors for the protonation kinetics of nitrides to make ammonia in acid. As ligand band centers have been shown to play critical roles in the formation of ligand vacancies and surface reaction kinetics, the position of ligand band centers can be examined both by using density functional theory (DFT) calculations and by combining X-ray emission spectroscopy (XES) and X-ray photoelectron spectroscopy (XPS). See, for example, Deml, A. M., Holder, A. M., O'Hayre, R. P., Musgrave, C. B. & Stevanović, V. Intrinsic material properties dictating oxygen vacancy formation energetics in metal oxides. *J. Phys. Chem. Lett.* 6, 1948-1953 (2015); Lee, Y. L., Kleis, J., Rossmeisl, J., Shao-Horn, Y. & Morgan, D. Prediction of solid oxide fuel cell cathode activity with first-principles descriptors. *Energy Environ. Sci.* 4, 3966-3970 (2011); Grimaud, A. et al. Double perovskites as a family of highly active catalysts for oxygen evolution in alkaline solution. *Nat. Commun.* 4, 2439 (2013); Jacobs, R., Hwang, J., Shao-Horn, Y. & Morgan, D. Assessing correlations of perovskite catalytic performance with electronic structure descriptors. *Chem. Mater.* 31, 785-797 (2019); Giordano, L. et al. Ligand-dependent energetics for dehydrogenation: implications in Li-ion battery electrolyte stability and selective oxidation catalysis of hydrogen-containing molecules. *Chem. Mater.* 31, 5464-5474 (2019); Hong, W. T. et al. Probing $LaMO_3$ metal and oxygen partial density of states using X-ray emission, absorption, and photoelectron spectroscopy. *J. Phys. Chem. C* 119, 2063-2072 (2015); and Hong, W. T. et al. Charge-transfer-energy-dependent oxygen evolution reaction mechanisms for perovskite oxides. *Energy Environ. Sci.* 10, 2190-2200 (2017), each of which is incorporated by reference in its entirety. Lowering the nitrogen 2p band centers relative to the nitride Fermi levels was found to lead to weaker metal-nitrogen bonds and smaller barriers for the creation of nitrogen vacancies, giving rise to faster ammonia formation kinetics. Besides, having high solubility of dissolved metal ions prevents the surface passivation by acid-stable oxide phases that hinder the kinetics. Notably, the protonation of two nitrides with soluble metal ions and the lowest nitrogen 2p bands, $Fe_2N$ and $Ni_3N$, can produce ammonia within minutes with ~100% yields of nitrogen.

The protonation kinetics of the nitride library were assessed by both measuring the ammonia yields after 24 hours (FIG. 1A) and the time-dependent ammonia formation profiles (FIG. 1B) in 0.1 M $H_2SO_4$. All nitrides were synthesized via a simple solid-state nitridation route, and were verified to be crystalline and phase-pure (FIGS. 5-8). The ammonia concentrations were quantified by the colorimetric method and $^1H$ nuclear magnetic resonance (NMR) spectroscopy. The metal concentrations were quantified by the inductively coupled plasma mass spectrometry (ICP-MS). The conversion rates were calculated via normalizing the measured concentrations by the maximum achievable concentrations assuming nominal chemical compositions and complete protonation (i.e. $M_xN_y+4yH^+ \rightarrow xM^{(3y/x)+}+yNH_4^+$, Table 1). Compared with the other nitrides, $Fe_2N$ and $Ni_3N$ were found to have the fastest ammonia formation kinetics, exhibiting complete protonation within 30 minutes in acid, with initial rates as high as 0.06 and 0.10 $mol_{ammonia}$ $h^{-1}$ $g_{nitride}^{-1}$ for $Fe_2N$ and $Ni_3N$, respectively. Interestingly, while WN had even higher initial rate (0.49 $mol_{ammonia}$ $h^{-1}$ $g_{nitride}^{-1}$), the protonation of WN significantly slowed down within the first 10 seconds, leading to ~16% yield after 24 hours. The protonation kinetics of the other nitrides were significantly slower than $Fe_2N$, $Ni_3N$ and WN, all with ammonia yields less than 8% within 24 hours in acid.

TABLE 1

The calculated mass concentrations of metal cations and the molar concentrations of ammonia at complete protonation for all metal nitrides in this study.

| Nitride | $C_{metal}$ (ppm) | $C_{ammonia}$ (μm) |
|---|---|---|
| $Fe_2N$ | 59.23 | 530.37 |
| $Ni_3N$ | 61.75 | 350.71 |
| WN | 61.94 | 336.96 |
| TiN | 51.57 | 1077.45 |
| NbN | 57.93 | 623.55 |
| VN | 52.28 | 1026.44 |
| ZrN | 57.79 | 633.52 |
| CrN | 52.51 | 1010.05 |
| $Ta_3N_5$ | 59.04 | 543.87 |

Figure 2A:
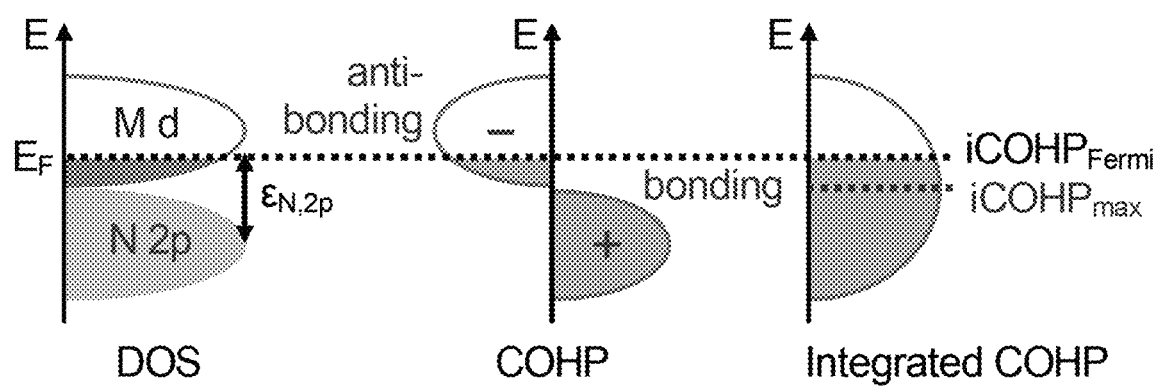
Figure 2D:
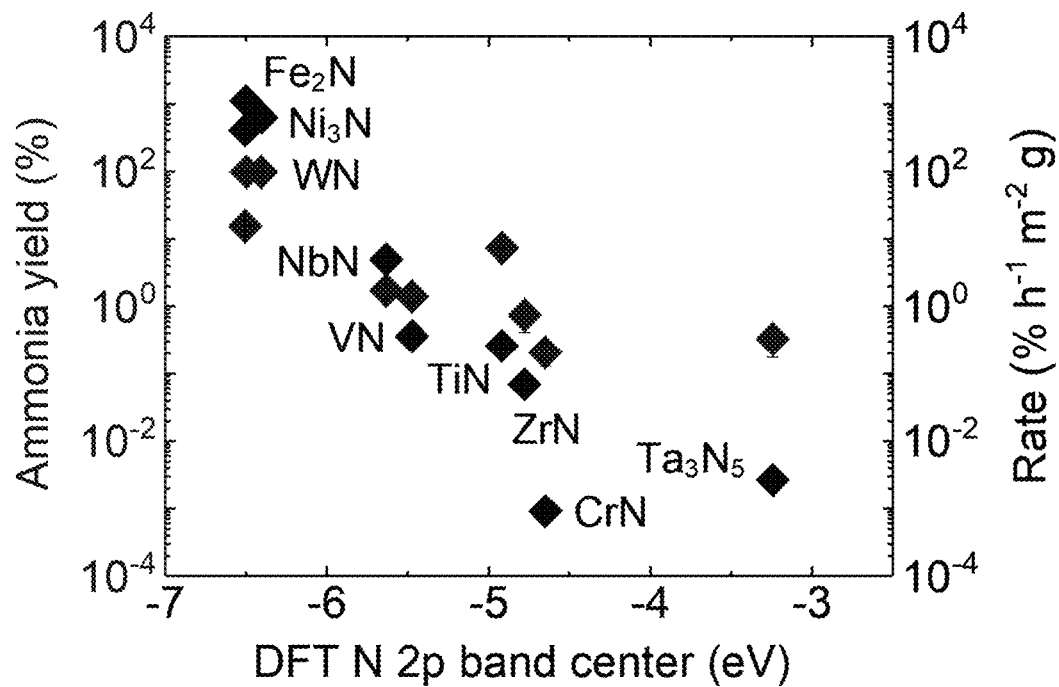
Figure 2E:
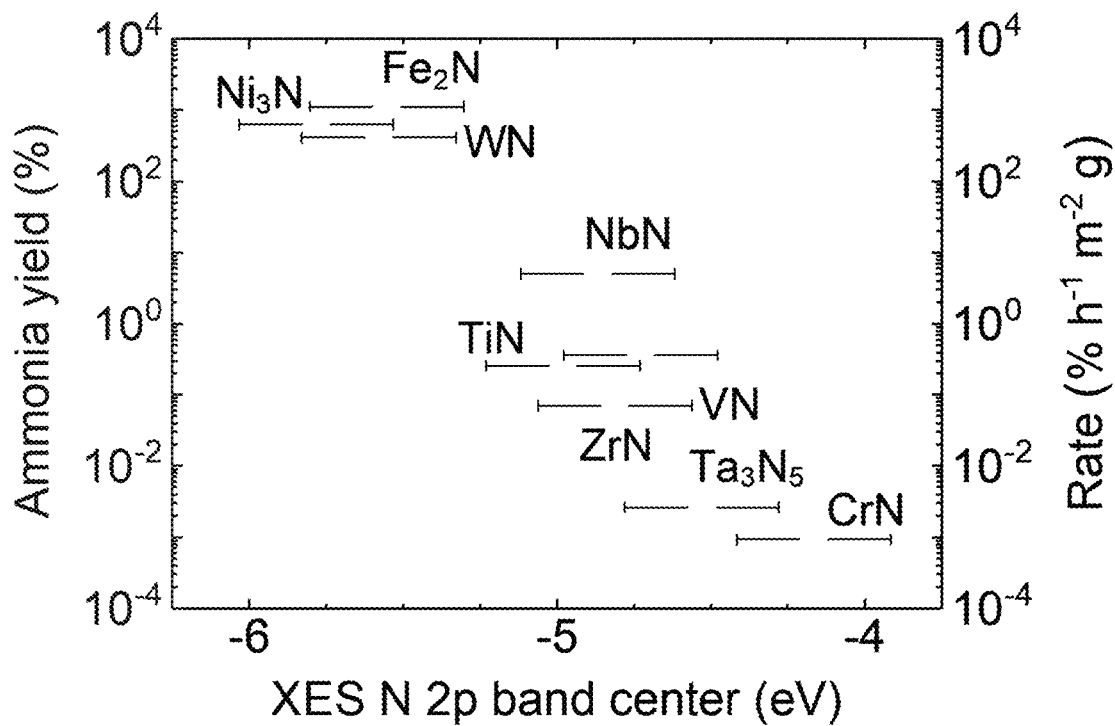
Figure 2F:
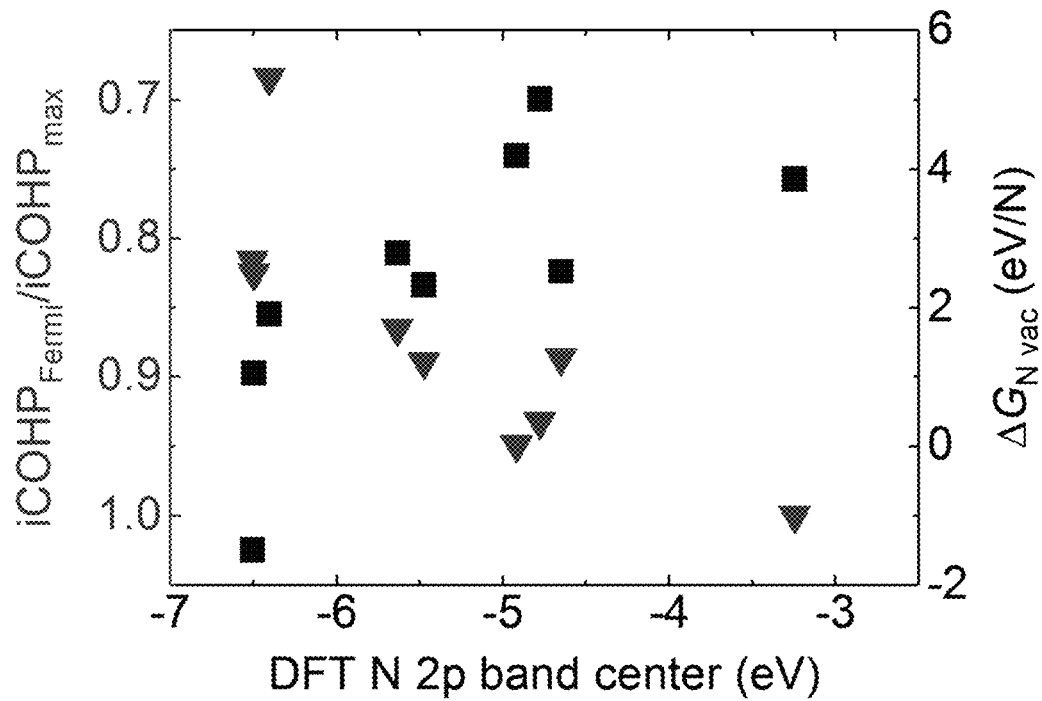
Figure 15:
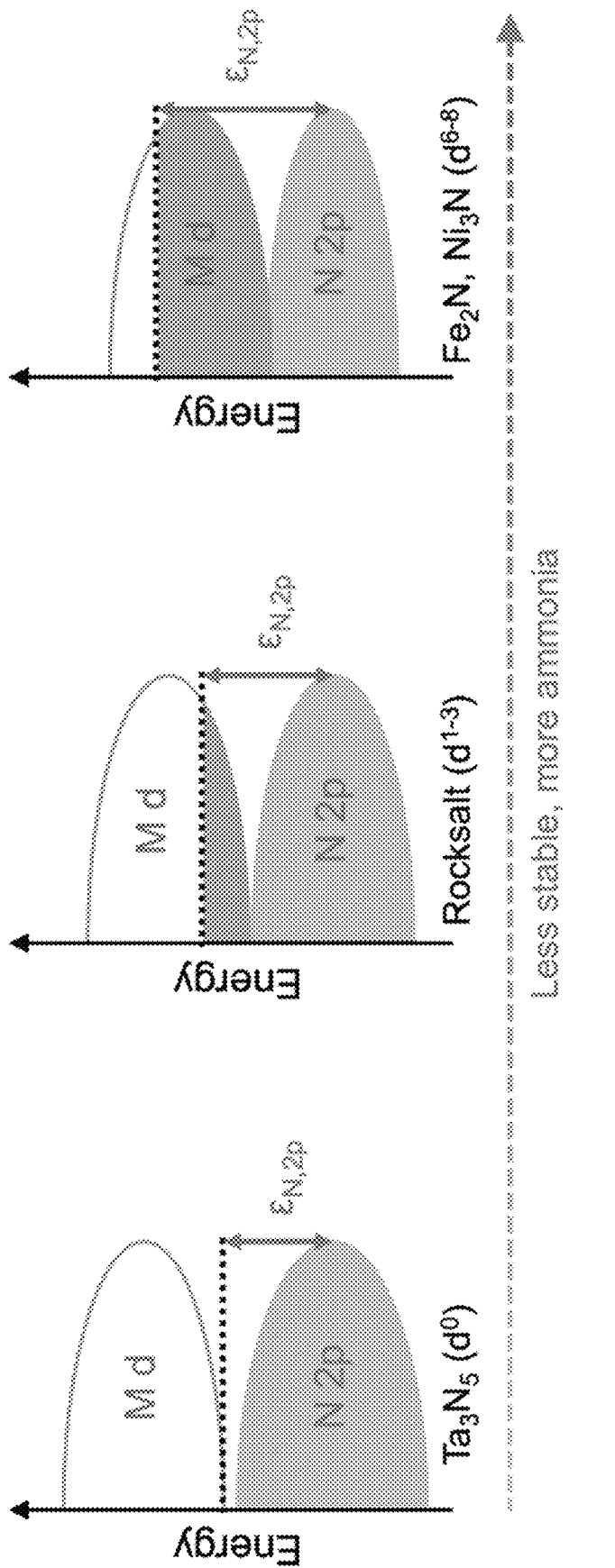
FIG. 15 depicts schematic band diagrams of $d^0$ nitrides (e.g. $Ta_3N_5$), $d^{1-3}$ nitrides (rocksalt nitrides, i.e. TiN, VN, CrN, ZrN, NbN and WN) and $d^{6-8}$ nitrides ($Fe_2N$ and $Ni_3N$). Dashed black lines indicate the Fermi levels, and $\varepsilon_{N,2p}$ denotes the nitrogen 2p band centers relative to the Fermi levels.
Figure 16:
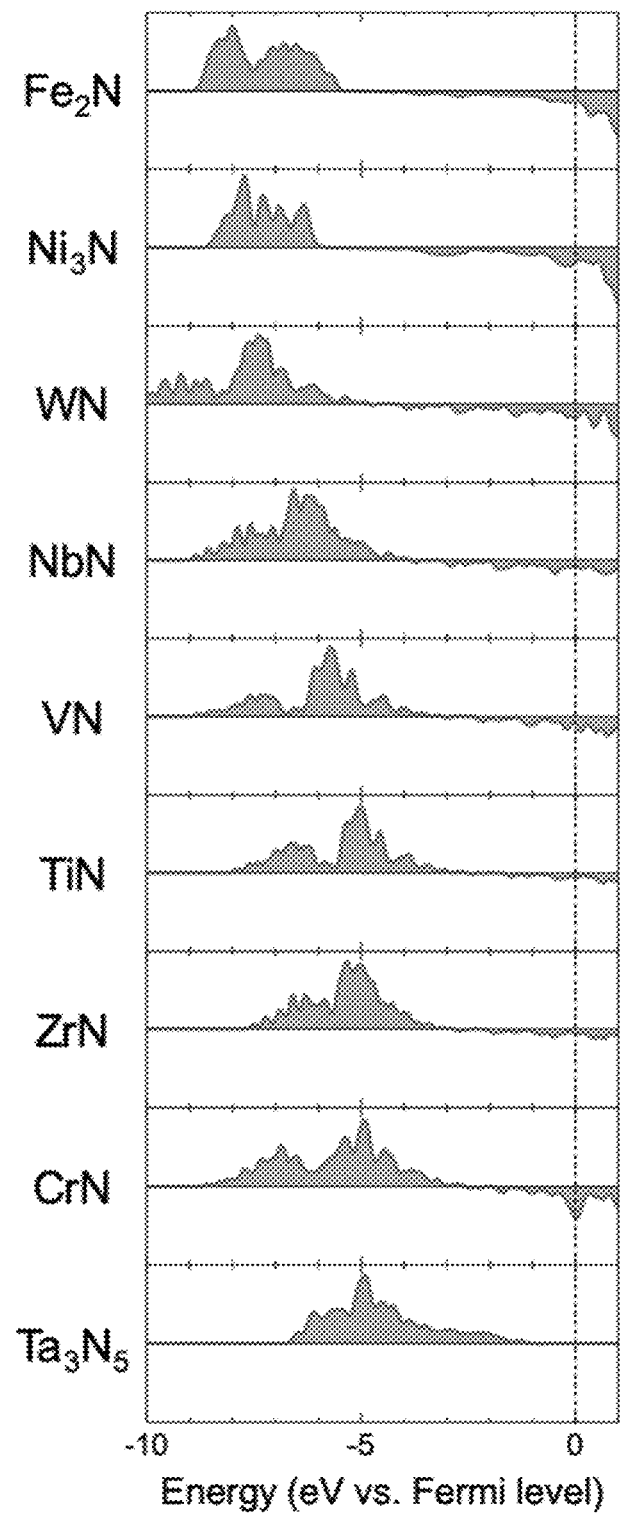
FIG. 16 depicts crystal orbital Hamilton populations (COHPs) of all metal nitrides in this study. COHPs indicate the bonding (COHP>0) or antibonding (COHP<0) characters of electronic orbitals.
Figure 17:
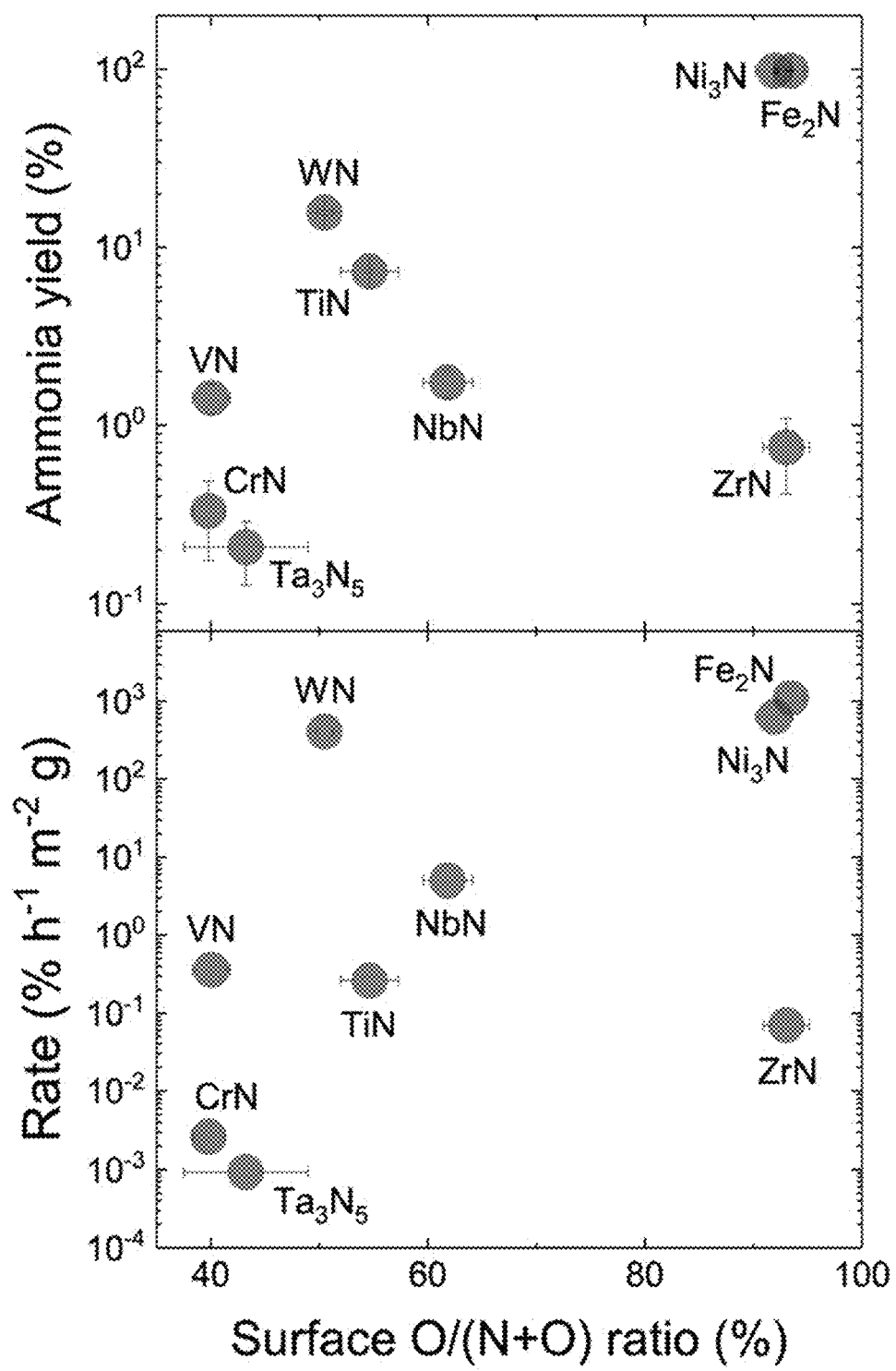
FIG. 17 depicts lack of dependence of the ammonia yields after 24 hours and the initial ammonia formation rates on the surface O/(N+O) ratios (estimated from XPS survey spectra). Error bars represent s.d. from three independent measurements.
Figure 18:
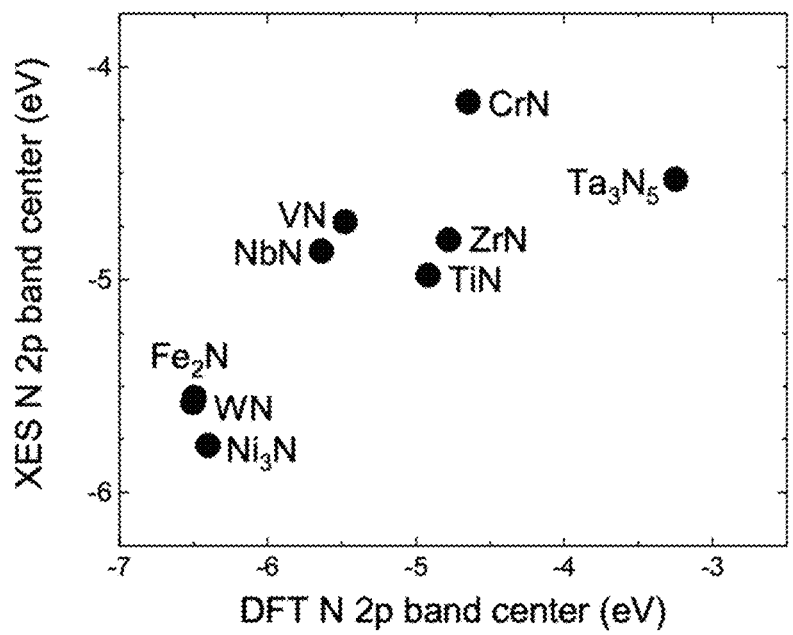
FIG. 18 depicts a comparison of the nitrogen 2p band centers relative to the Fermi levels, obtained by density functional theory (DFT) and X-ray emission spectroscopy (XES). The trends in DFT 2p band centers are in qualitative agreement with those in XES 2p band centers. While DFT captures the occupied and unoccupied orbitals at the ground state, XES probes the electronic bands with excited state effects, which is likely to give rise to the differences in DFT and XES nitrogen 2p band centers. Moreover, DFT is not good at estimating the band gaps and Fermi levels for insulators, which can also lead to the difference in band centers for $Ta_3N_5$. See, for example, Nilsson, A. & Pettersson, L. G. M. Chemical bonding on surfaces probed by X-ray emission spectroscopy and density functional theory. *Surf Sci. Rep.* 55, 49-167 (2004); and Perdew, J. P. Density functional theory and the band gap problem. *Int. J. Quantum Chem.* 28, 497-523 (1985), each of which is incorporated by reference in its entirety.

The position of nitrogen 2p band centers, quantified both computationally and experimentally, was shown to control the metal-nitrogen bond strength and serve as a descriptor for the protonation of metal nitrides and subsequent ammonia formation in acidic solutions. While band centers can be typically obtained from the DFT projected density of states (DOS, FIGS. 2A-2B), nitrogen 2p band centers were also determined using soft X-ray spectroscopy (FIG. 2C). Lowering the nitrogen 2p bands relative to the nitride Fermi levels was found to be strongly correlated with increasing both the ammonia yields after 24 hours and the initial rates of protonation (FIGS. 2D-2E). Such trends can be rationalized by the weakening of metal-nitrogen bonds when moving the Fermi levels away from the nitrogen 2p bands (FIG. 15), as supported by the crystal orbital Hamilton population (COHP) analysis. While the DOS describes the number of electronic states at different energy levels, COHP indicates the bonding (COHP>0) or antibonding (COHP<0) characters of orbitals in covalent bonds (FIG. 2A). Lifting up the nitride Fermi levels with respect to the nitrogen 2p bands increases the electron filling in antibonding metal d states, and therefore gives rise to weaker metal-nitrogen bonds (FIG. 2F and FIG. 16), which lead to faster protonation in acidic solutions. Although all nitrides were partially oxidized on the surface due to exposure to air (FIG. 8), no correlation was shown between the protonation and the degree of partial surface oxidation (FIG. 17), indicating that the oxynitride overlayers on as-synthesized nitrides have negligible influence on the overall protonation kinetics, and the ammonia formation is directly controlled by the bulk energetics.

The critical role of nitrogen 2p band centers in controlling the nitride protonation kinetics was supported by the computed free energy barriers for the creation of nitrogen vacancies. Lowering the nitrogen 2p bands was shown to significantly reduce the energy penalty for the formation of nitrogen vacancies (up to −7 eV, FIG. 2F), indicating much larger thermodynamic driving force for ammonia formation from lattice nitrogen. The observed dependence of the formation energetics of nitrogen vacancies on the occupancy of antibonding orbitals and thus the covalent bond strength is consistent with the trends reported for ternary $M_{0.25}Mn_{1.75}N$ and $M_{0.5}Mo_{1.5}N$, and intrinsically different from the energetics of oxygen vacancies in transition metal oxides. See, for example, Lee, Y. L., Kleis, J., Rossmeisl, J., Shao-Horn, Y. & Morgan, D. Prediction of solid oxide fuel cell cathode activity with first-principles descriptors. *Energy Environ. Sci.* 4, 3966-3970 (2011); Michalsky, R., Pfromm, P. H. & Steinfeld, A. Rational design of metal nitride redox materials for solar-driven ammonia synthesis. *Interface Focus* 5, 20140084 (2015); and Deml, A. M., Stevanović, V., Muhich, C. L., Musgrave, C. B. & O'Hayre, R. Oxide enthalpy of formation and band gap energy as accurate descriptors of oxygen vacancy formation energetics. *Energy Environ. Sci.* 7, 1996-2004 (2014), each of which is incorporated by reference in its entirety. The creation of oxygen vacancies in metal oxides is energetically dominated by the penalty for the redistribution of electrons from the oxygen 2p states to the Fermi levels after the removal of oxygen from the lattice, instead of the metal-oxygen bond strength, and thus decreasing the oxygen 2p band centers relative to the Fermi levels leads to larger formation barriers for oxygen vacancies. See, for example, Lee, Y. L., Kleis, J., Rossmeisl, J., Shao-Horn, Y. & Morgan, D. Prediction of solid oxide fuel cell cathode activity with first-principles descriptors. *Energy Environ. Sci.* 4, 3966-3970 (2011), which is incorporated by reference in its entirety. However, for nitrides, it is hypothesized that they exhibit negligible penalty for electron redistribution due to the stronger covalency than oxides. Therefore, the energetics of nitrogen vacancies are dictated by the metal-nitrogen bond strength, and lowering the nitrogen 2p bands gives rise to less stability.

Figure 1B:
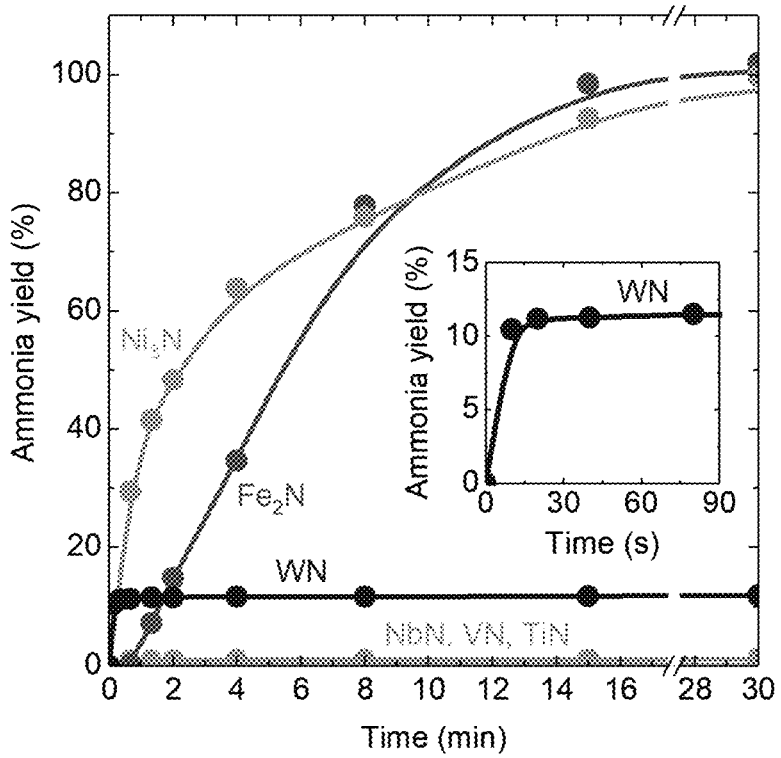
Figure 3A:
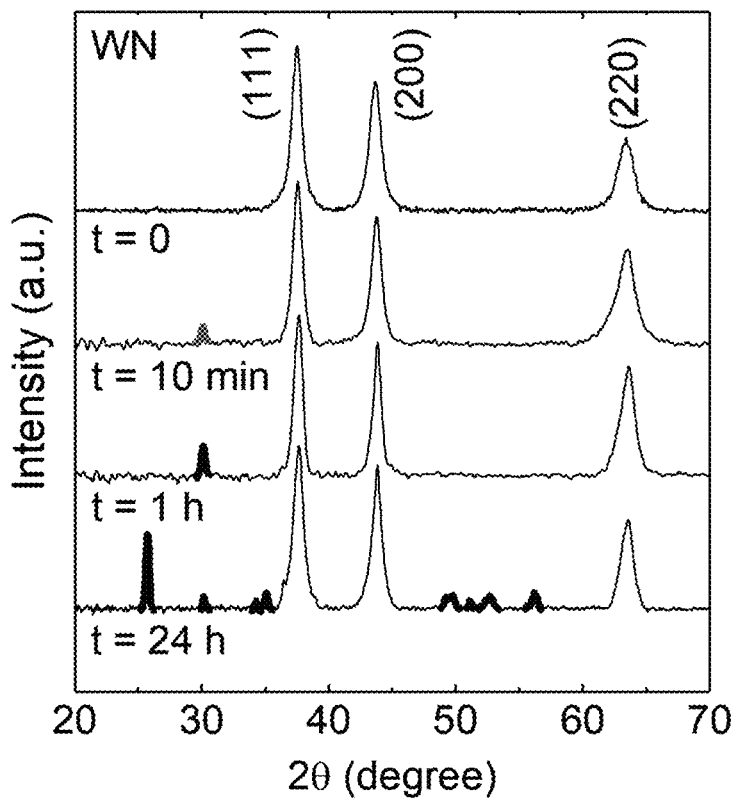
Figure 3B:
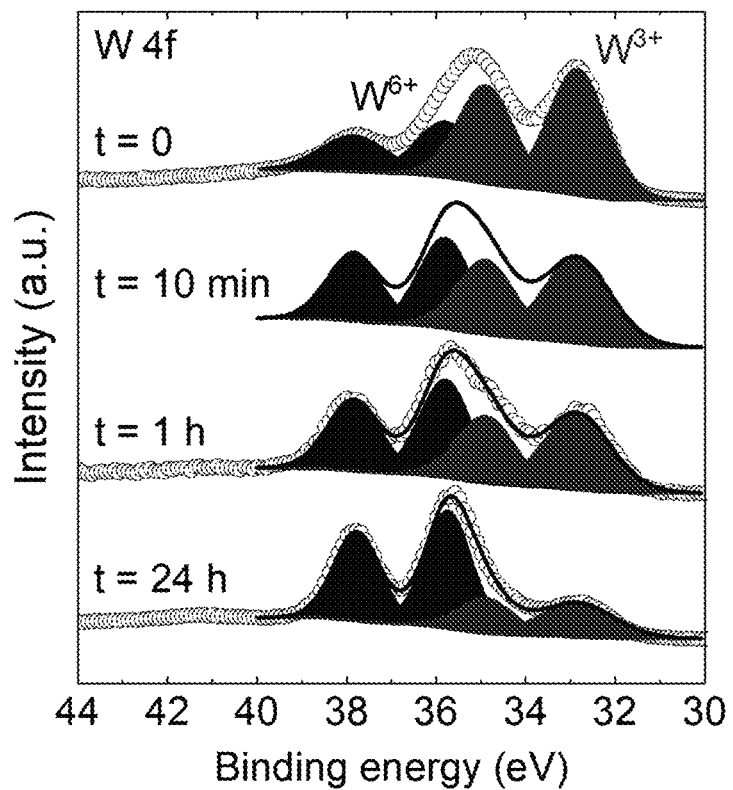
Figure 3C:
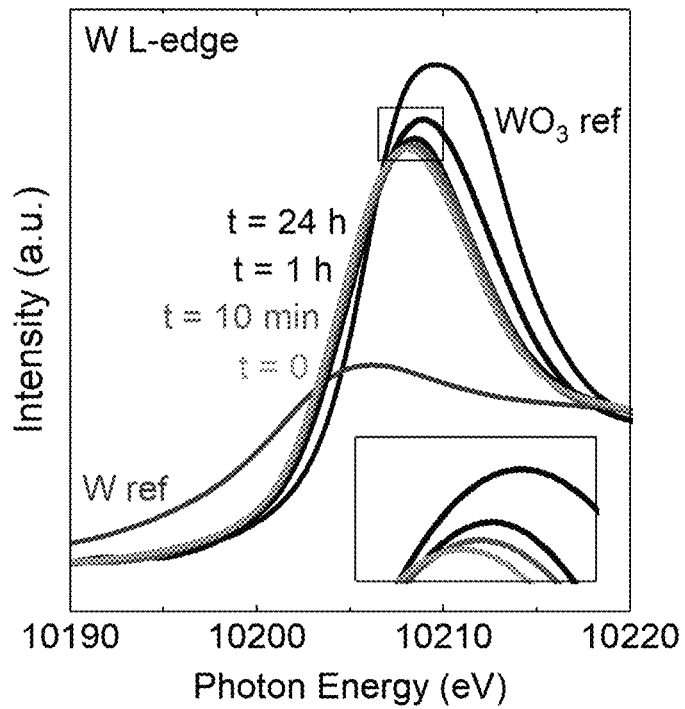
Figure 19:
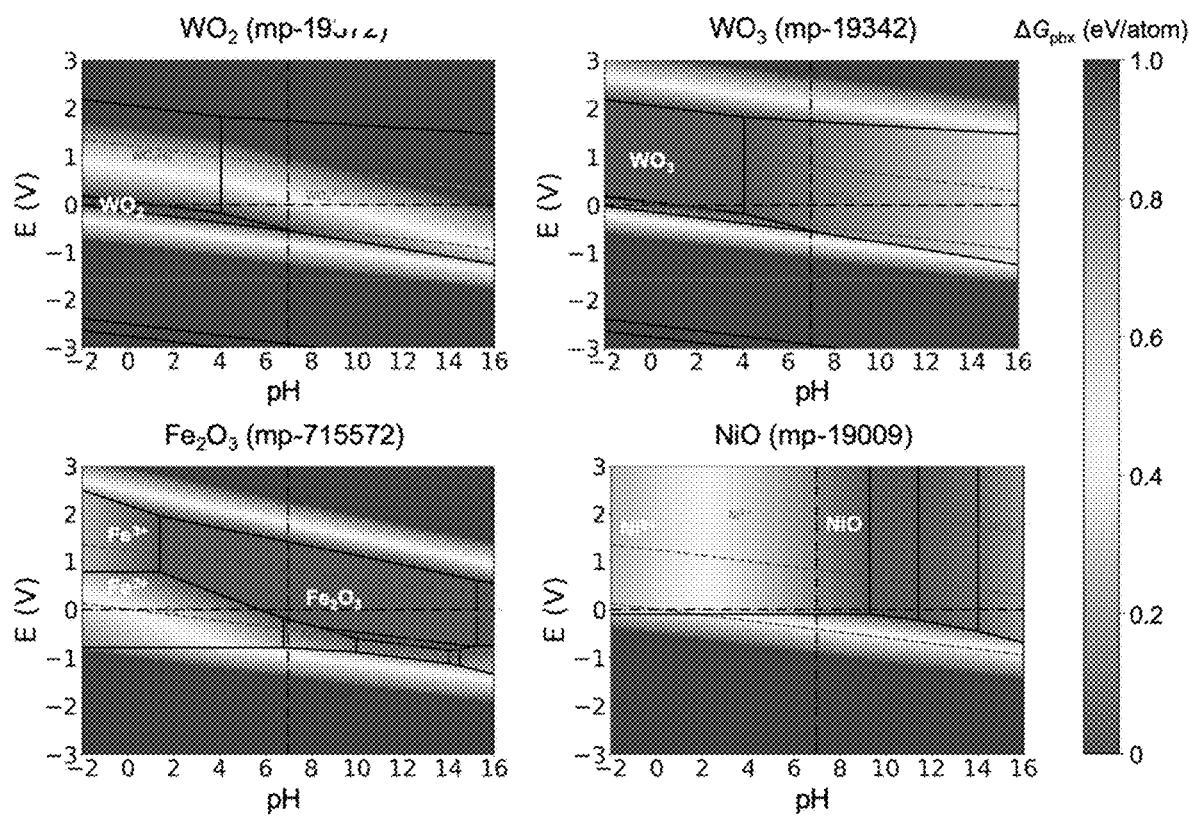
FIG. 19 depicts computationally predicted Pourbaix diagrams. Computed Pourbaix diagrams of the panel a, panel b, W—O—H, panel c, Fe—O—H, panel d, Ni—O—H systems generated using the Materials Project API. See, for example, Jain, A. et al. Commentary: The Materials Project: a materials genome approach to accelerating materials innovation. *APL Mater.* 1, 11002 (2013); Ong, S. P. et al. The materials application programming interface (API): a simple, flexible and efficient api for materials data based on representational state transfer (REST) principles. *Comput. Mater. Sci.* 97, 209-215 (2015), each of which is incorporated by reference in its entirety. The Pourbaix above-hull energies ($\Delta G_{pbx}$) of the thermodynamically stable oxide phases, including panel a, $WO_2$, b, $WO_3$, panel c, $Fe_2O_3$ and panel d, NiO (using the phase diagram app in the Materials Project) are superimposed over the Pourbaix diagrams as thermodynamic stability maps. Dashed red lines indicate the $H_2/H^+$ and $O_2/H_2O$ redox levels. Horizontal and vertical dashed black lines indicate standard hydrogen electrode and pH 7, respectively. All ion concentrations are assumed to be $10^{-6}$ M in the solutions.
Figure 20:
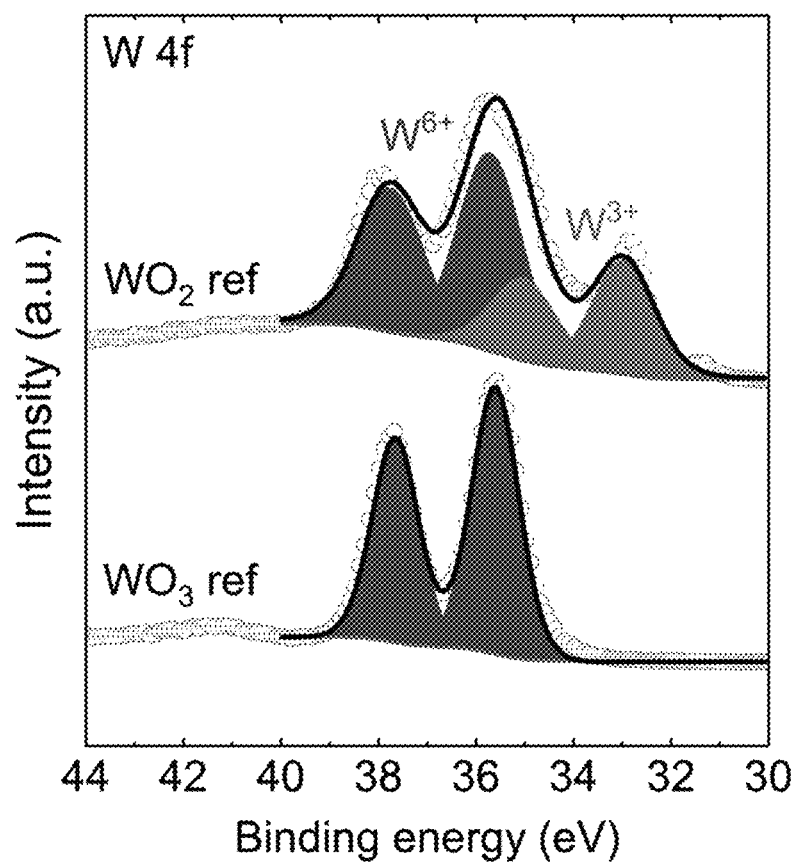
FIG. 20 depicts W 4f XPS spectra of $WO_2$ and $WO_3$ references. The two sets of $4f_{7/2}$ and $4f_{5/2}$ doublets from low to high binding energy correspond to $W^{3+}$ and $W^{6+}$, respectively.
Figure 21:
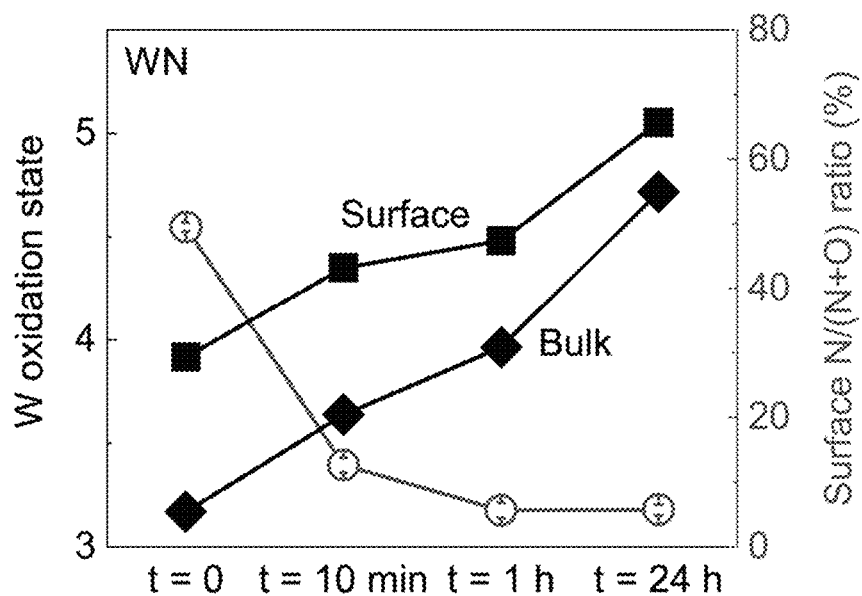
FIG. 21 depicts the bulk and surface W oxidation states (estimated from W L-edge XANES and W 4f XPS spectra, respectively) and surface N/(N+O) ratios (estimated from XPS survey spectra) for WN before and after protonation. Error bars represent s.d. from three independent measurements.
Figure 22:
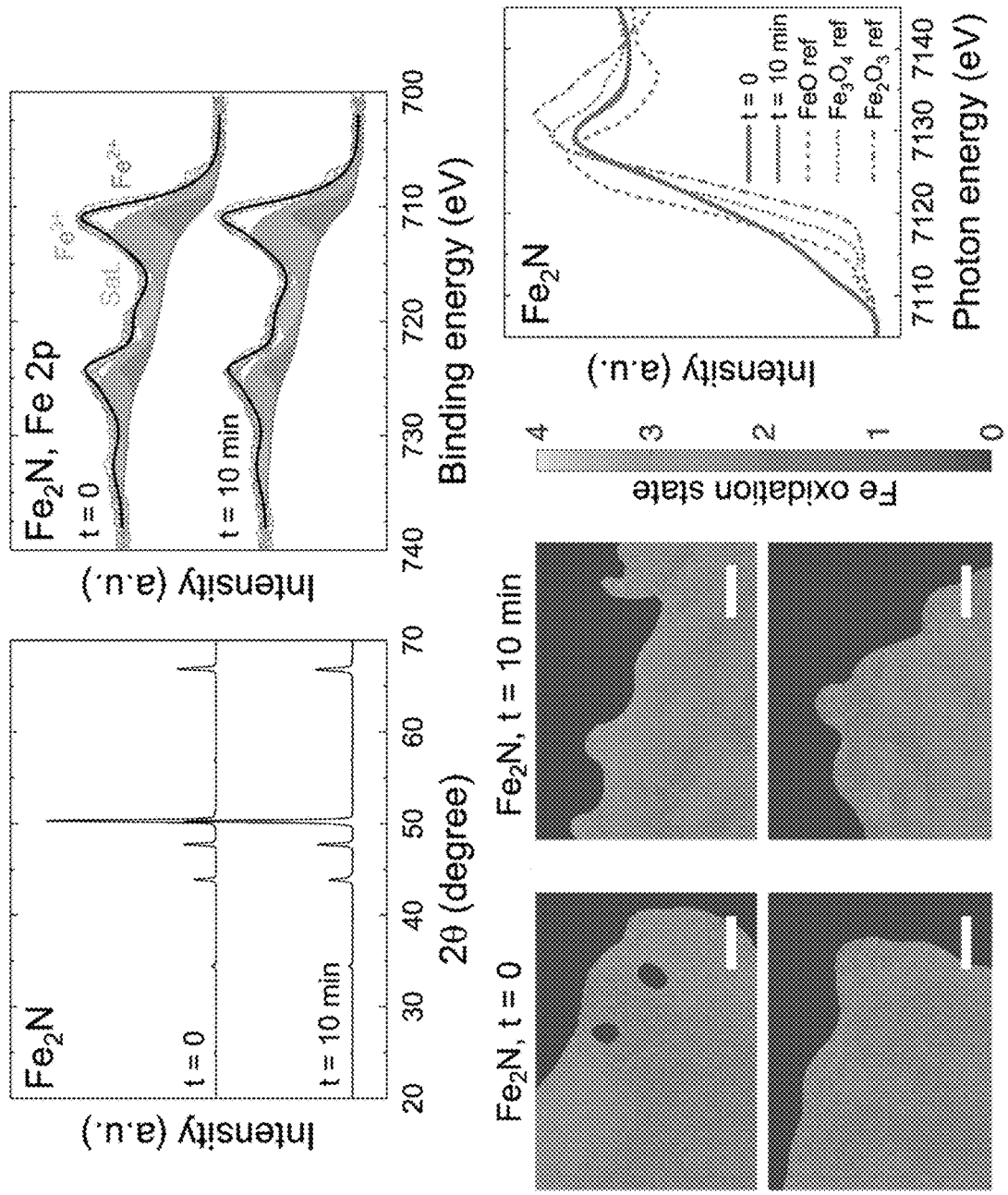
FIG. 22 depicts characterizations of $Fe_2N$ before and after protonation. Panel a, PXRD patterns, panel b, Fe 2p XPS spectra, panel c, panel d, 2D Fe oxidation state mapping and panel e, Fe K-edge X-ray absorption near edge structure (XANES) spectra of $Fe_2N$ before and after protonation. All diffraction peaks can be assigned to the hexagonal $Fe_2N$ phase (P$\bar{3}$1m, a=b=0.48 nm, c=0.42 nm, FIGS. 4 and 5). The three sets of $2p_{3/2}$ and $2p_{1/2}$ doublets from low to high binding energy correspond to $Fe^{2+}$, $Fe^{3+}$ and satellite peaks, respectively. Scale bar in 2D oxidation state maps: 1 Colorbar indicates the Fe oxidation states.
Figure 23:
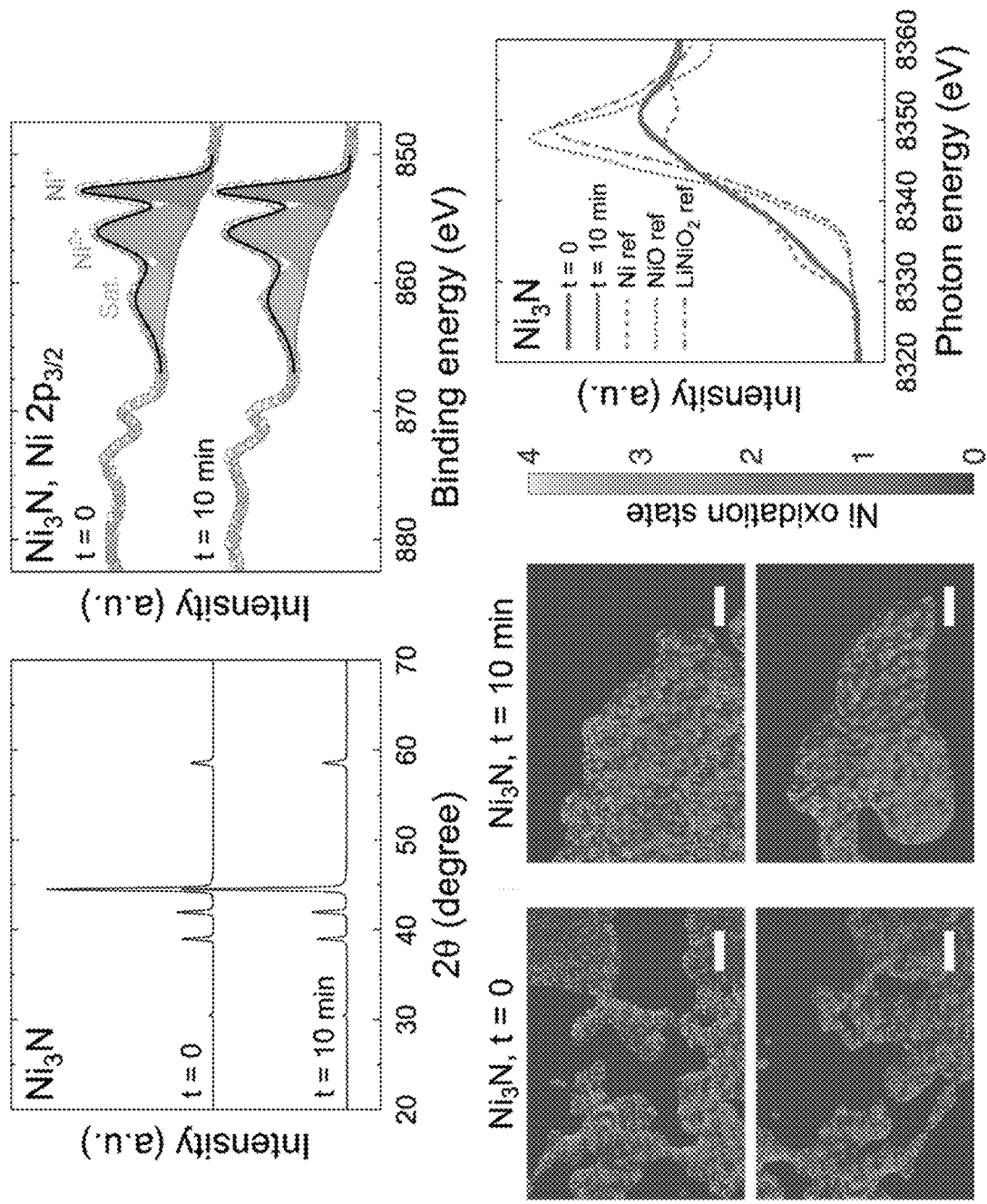
FIG. 23 depicts characterizations of $Ni_3N$ before and after protonation. Panel a, PXRD patterns, panel b, Ni 2p XPS spectra, panel c, panel d, 2D Ni oxidation state mapping and panel e, Ni K-edge XANES spectra of $Ni_3N$ before and after protonation. All diffraction peaks can be assigned to the hexagonal $Ni_3N$ phase (P6$_3$22, a=b=0.46 nm, c=0.43 nm, FIGS. 4 and 5). The three sets of $2p_{3/2}$ and $2p_{1/2}$ doublets from low to high binding energy correspond to $Ni^+$, $Ni^{2+}$ and satellite peaks, respectively. Scale bar in 2D oxidation state maps: 1 μm. Colorbar indicates the Ni oxidation states.

While the driving force of nitride protonation is determined by the nitrogen 2p bands, the ammonia formation kinetics can be inhibited by lowering the solubility of dissolved metal ions. WN with comparable nitrogen 2p band center (FIGS. 2B-2C) and energetics (FIG. 2F) to $Fe_2N$ and $Ni_3N$ was found to have comparably fast protonation after exposure to acidic solutions, but the kinetics were significantly reduced within the first minute (FIG. 1B). According to the DFT-computed Pourbaix diagrams (FIG. 19), tungsten oxides ($WO_2$ and $WO_3$), instead of W ions, are predicted to be the thermodynamically stable species in acidic pHs, while both Fe and Ni cations are stable in acid. Thus, it is proposed that the protonation of WN was hindered due to the surface passivation by acid-stable tungsten oxide phases precipitated from the initially dissolved but insoluble W ions (e.g. $W^{3+}+0.75O_2+1.5H_2O \rightarrow WO_3+3H^+$). The formation of tungsten oxides was supported by the powder X-ray diffraction (PXRD) patterns of WN after protonation (FIG. 3A), with the appearance of a secondary phase at ~30° after 10 minutes in acid, and increased intensity after 1 hour, which can be eventually indexed to fully oxidized tungsten oxide hydrates ($WO_3 \cdot H_2O$) after protonation for 24 hours. The observation of $WO_3 \cdot H_2O$ phase is in agreement with the increase in both the intensities of $W^{6+}$ doublet peaks (FIG. 3B and FIG. 20) and the surface atomic O/(N+O) ratios (FIG. 21), as revealed by XPS, as well as the shift of absorption edge to higher energies in W L-edge X-ray absorption near edge structure (XANES, FIG. 3C), with increasing time of exposure to $H_2SO_4$. On the other hand, no new phase was observed for $Fe_2N$ (FIG. 22) and $Ni_3N$ (FIG. 23) after protonation in acid.

The formation of surface tungsten oxide phases upon the exposure of WN to acidic solutions was further visualized by the full-field transmission X-ray microscopy (TXM). The tungsten oxidation states at WN particle edges were found to increase after 10 minutes in acid (FIG. 3E), which became increasingly pronounced in 1 hour (FIG. 3F). After 24 hours, the particles were even more oxidized, and fully oxidized ($W^{6+}$) species can be observed (FIG. 3G). These observations were consistent with the higher tungsten oxidation states on the surface than in bulk estimated from the X-ray spectra (FIG. 21), confirming the formation of highly oxidized tungsten oxides (e.g. $WO_3 \cdot H_2O$) on WN after exposure to acid, instead of individual oxide and nitride particles. In contrast to WN, negligible change in the oxidation states of metal cations was detected for $Fe_2N$ (FIG. 22) and $Ni_3N$ (FIG. 23) after protonation in $H_2SO_4$ solutions.

In summary, unprecedented nitride protonation and ammonia formation kinetics in acid is reported, where $Fe_2N$ and $Ni_3N$ can reach ~100% yields of nitrogen within minutes in 0.1 M $H_2SO_4$ solutions. Moreover, lowering the nitrogen 2p band centers relative to the Fermi levels and increasing the solubility of dissolved metal cations were found to lead to weaker metal-nitrogen bonds and larger driving force for the creation of nitrogen vacancies, and prevent surface passivation by acid-stable oxide phases, respectively, which jointly contribute to faster protonation in acidic solutions.

These earth-abundant, easy-to-synthesize late transition metal nitrides, $Fe_2N$ and $Ni_3N$, with excellent bulk stability in air and superior kinetics for ammonia generation in acidic pHs, can be potentially incorporated into the existing centralized ammonia production networks as ammonia transport vectors. For example, large-scale nitride production can be coupled with the conventional Haber-Bosch reactors, given their similar operating temperatures. After generating ammonia from nitride protonation, the next cycle of production can be accomplished utilizing the metal oxide or metal salt precursors recovered from the solutions. In addition, distributed ammonia synthesis can be potentially achieved if the nitride production can be conducted using earth-abundant nitrogen sources such as $N_2$, nitrites or nitrates. Further efforts, such as techno-economic evaluations and system-level designs, are required to assess and optimize the efficiency of these processes.

The design principles of nitride protonation and decomposition based on nitrogen 2p band centers established in this study can be potentially extended to other processes in acidic systems. Given the vast opportunities in designing new chemistries within the relatively uncharted nitride chemical space, and the much promise in tuning the stability of nitrides for diverse functionalities in acidic systems (e.g. as catalyst cores in proton exchange membrane fuel cells), it would be exciting to explore how the descriptors established here can be extended and provide guiding principles for the design of new nitride chemistries for solid ammonia storage and other applications. See, for example, Sun, W. et al. A map of the inorganic ternary metal nitrides. Nat. Mater. 18, 732-739 (2019); and Gohl, D. et al. Engineering stable electrocatalysts by synergistic stabilization between carbide cores and Pt shells. Nat. Mater. 19, 287-291 (2020), each of which is incorporated by reference in its entirety.

Methods

Materials Synthesis.

All reagents were commercially available and used as received. Generally, transition metal nitrides were prepared from metal nitride, metal oxide or metal salt precursors. In a typical synthesis, 0.5 g of precursor was loaded into a ceramic boat, nitridized at 350-900° C. with a heating rate of 2° C. min$^{-1}$ in a flow of ultra-high purity $NH_3$ (100 cm$^3$ min$^{-1}$, Airgas) for 1-20 h, furnace cooled to room temperature and passivated for 30 min with a 1% $O_2$/99% $N_2$ mixture (100 cm$^3$ min$^{-1}$, Airgas). Passivated samples were quickly removed and placed in glass vials before characterization. The complete list of nitrides, precursors, (re)nitridation temperatures and hold time is: $Fe_2N$, $Fe_2O_3$ (Sigma-Aldrich), 500° C., 6 h; $Ni_3N$, $NiCl_2$ hexahydrate (Sigma-Aldrich), 350° C., 6 h; WN, $WO_3$ (Sigma-Aldrich), 700° C., 3 h; TiN, TiN (Strem Chemicals), 900° C., 3 h; NbN, $Nb_2O_5$ (Sigma-Aldrich), 750° C., 11 h; VN, VN (Strem Chemicals), 350° C., 1 h; ZrN, ZrN (Strem Chemicals), 900° C., 20 h; CrN, Cr2O3 (Sigma-Aldrich), 770° C., 14 h; $Ta_3N_5$, $Ta_2O_5$ (Sigma-Aldrich), 900° C., 20 h.

Characterization.

PXRD measurements for all nitrides except $Fe_2N$ were performed using a Bruker Advance II diffractometer equipped with a θ/2θ Bragg-Brentano geometry and Ni-filtered Cu Kα radiation (λ=1.5406 Å). Due to the strong fluorescence from Fe-containing samples when using Cu X-ray source, PXRD pattern for $Fe_2N$ was collected using a Bruker D8 general area detector diffraction system equipped with a two-dimensional area detector and Co Kα radiation (λ=1.7902 Å). All spectra of as-synthesized nitrides were collected for powder samples in a step scan mode with a step size of 0.02°, a step time of 1 second per step, and a scan range from 20° to 90°. All spectra of nitrides after protonation were collected for powder samples in a step scan mode with a step size of 0.04°, a step time of 30 seconds per step, and a scan range from 20° to 70°. The PXRD spectra of all as-synthesized nitrides were compared with the standard patterns from the International Centre for Diffraction Data database and the simulated PXRD spectra generated using VESTA based on DFT optimized structure models. See, for example, Momma, K. & Izumi, F. VESTA 3 for three-dimensional visualization of crystal, volumetric and morphology data. J. Appl. Crystallogr. 44, 1272-1276 (2011), which is incorporated by reference in its entirety. The average crystalline grain sizes of as-synthesized nitrides were estimated using Scherrer equation and assuming a shape factor of 0.9.

XPS measurements were conducted using a Thermo Scientific Nexsa X-ray photoelectron spectrometer system, with monochromatic Al Kα radiation (1486.6 eV) and a low energy flood gun as a neutralizer. The binding energy of the C 1s peak at 284.8 eV was used as a reference for charge correction. The Fe 2p, Ni 2p and W 4f core-level spectra were fitted using Gaussian-Lorentzian peaks (30% Lorentzian) after Shirley-type background subtraction. The surface area of each nitride was determined using a Quantachrome ChemBET Pulsar system from a single-point BET analysis performed after 12 h outgassing at 150° C. in $N_2$ atmosphere. Raman spectra for all nitrides except CrN were measured using a Horiba LabRAM HR microscope Raman spectrometer system with 532 and 632 nm laser excitation. Raman spectrum for CrN was measured using a Renishaw inVia reflex Raman microscope with 785 nm laser excitation. SEM images were collected using a Zeiss Merlin high-resolution scanning electron microscope at 5 kV. See Table 2.

TABLE 2

Brunauer-Emmett-Teller surface areas and the average crystalline grain sizes estimated based on Scherrer equation for all metal nitrides in this study.

| Nitride | $S_{BET}$ (m$^2$ g$^{-1}$) | $D_{grain}$ (nm) |
| --- | --- | --- |
| $Fe_2N$ | 0.64 | 36.48 |
| $Ni_3N$ | 3.48 | 25.29 |
| WN | 23.52 | 6.29 |
| TiN | 1.52 | 23.32 |
| NbN | 22.51 | 12.34 |
| VN | 7.52 | 19.67 |
| ZrN | 0.31 | 24.66 |
| CrN | 11.53 | 24.22 |
| $Ta_3N_5$ | 6.99 | 25.32 |

Protonation of Metal Nitrides.

The protonation of metal nitrides in acidic conditions were assessed by adding 20 mg of nitrides into 300 mL 0.1 M $H_2SO_4$ (Sigma-Aldrich, ACS reagent) solutions, with constant stirring using magnetic stirrers (800 rpm). Deionized (DI) water (18.2 MΩ cm at 25° C.) was used from a Millipore Milli-Q water purification system, and was freshly prepared just before use. For each sample, 3 mL of solution was taken, filtered and stored for quantification. Nitride powders after protonation for a specific amount of time were filtered, washed with DI water, dried in air and stored for characterization.

Ammonia Quantification by Colorimetric Method.

The ammonia concentrations were colorimetrically quantified using the salicylate method, which has been modified based on the original method reported in Bower, C. E. & Holm-Hansen, T. A salicylate-hypochlorite method for determining ammonia in seawater. Can. J. Fish. Aquat. Sci. 37, 794-798 (1980); and Le, P. T. T. & Boyd, C. E. Comparison of phenate and salicylate methods for determination of total ammonia nitrogen in freshwater and saline water. J. World Aquac. Soc. 43, 885-889 (2012), each of which is incorporated by reference in its entirety. This method only works for neutral or alkaline samples, because in acid pHs, sodium salicylate precipitates out of the solutions as salicylic acid. Given that the samples after protonation were highly acidic, for each sample, 2.5 mL of sample was neutralized with 2.85 mL 0.2 M KOH (Sigma-Aldrich, ACS reagent) just prior to the quantification, because ammonia losses by evaporation are more severe in alkaline conditions. Three reagent solutions were prepared: the salicylate catalyst solution (S1), the alkaline citrate solution (S2) and the alkaline hypochlorite solution (S3). S1 was prepared by dissolving sodium salicylate (EMSURE Millipore, for analysis) and sodium nitroprusside dihydrate (EMSURE Millipore, for analysis) in DI water to obtain a 2.75 M sodium salicylate and 0.95 mM sodium nitroprusside solution. S2 was prepared by dissolving sodium citrate dihydrate (EMSURE Millipore, for analysis) and KOH in DI water to obtain a 340 mM sodium citrate dihydrate and 465 mM KOH solution. S3 was prepared by mixing 10 vol. % of commercial 5% sodium hypochlorite aqueous solution (Sigma-Aldrich, reagent grade) with 90 vol. % of S2. Note that S1 and S3 should always be freshly prepared and cannot be stored for more than a day, but S2 can be prepared in advance and stored at room temperature. Besides, when not in use, S1 should be kept in an opaque dark bottle.

For each batch of samples, a set of calibration standards was prepared just before analyzing the samples. In order to get the calibration standards as similar as possible to the actual samples, the solvent for the calibration standards was prepared by mixing 0.1 M $H_2SO_4$ with 0.2 M KOH, in the same volume ratios used for neutralizing the samples. Then, a mother solution was prepared by dissolving ammonium chloride (EMSURE Millipore, for analysis) in the prepared solvent. The set of calibration standards was obtained by diluting the mother solution with the prepared solvent. A blank standard (i.e. solvent with no mother solution) was always included. For each quantification, 5 mL of sample or standard was mixed vigorously with 600 µL of S1 and 1 mL of S3 in the dark. Then, all solutions were stored in the dark. After color development for 1 h, the ultraviolet-visible (UV-Vis) spectra of all solutions were measured using a Thermo Scientific GENESYS 180 UV-Vis spectrophotometer. The blank calibration standard was used as the blank solution and reference solution for UV-vis measurements. All UV-vis spectra were collected from 850 nm to 350 nm, with a step size of 0.5 nm and a sweep speed of 5 nm s$^{-1}$.

Figure 9:
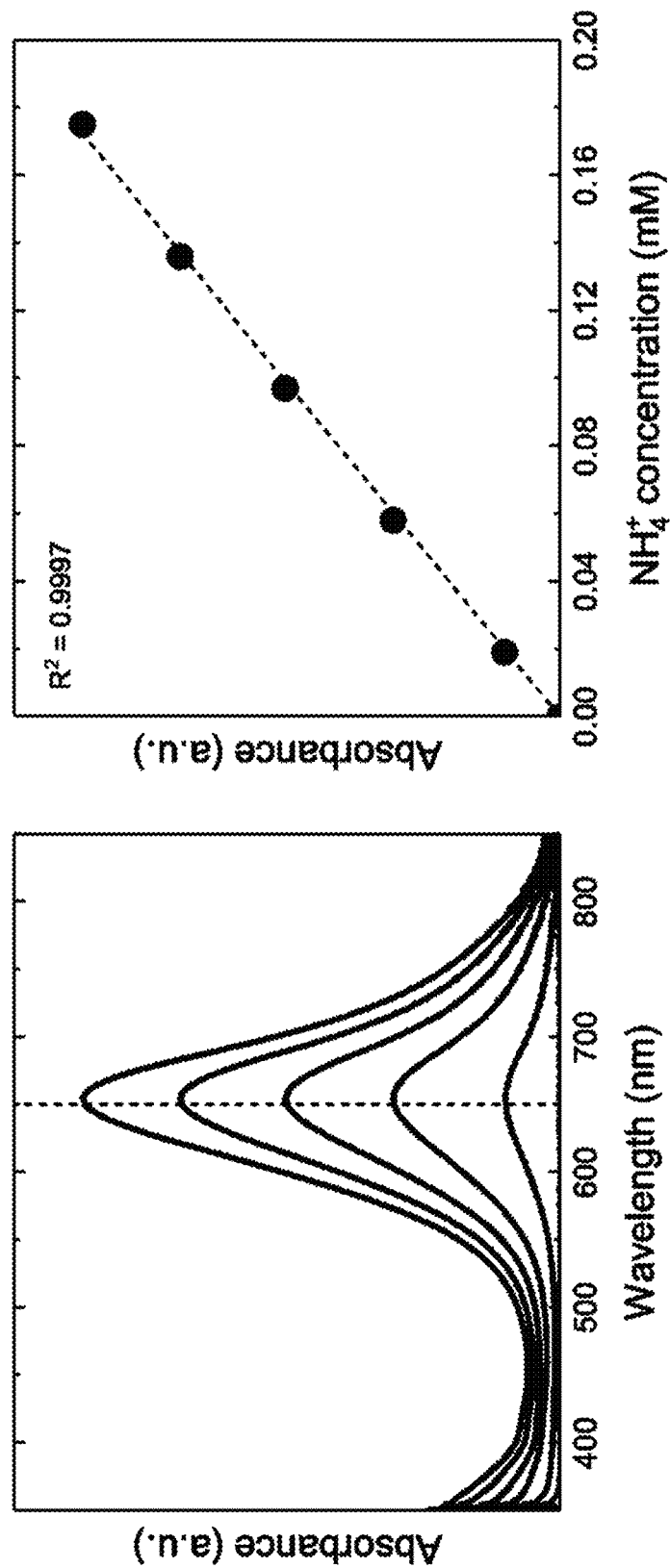
FIG. 9 depicts a calibration curve for ammonia concentration in colorimetric method. The calibration curve was obtained by plotting the absorbance at 650 nm ($A_{650}$) of the calibration standards versus their calculated ammonia concentrations.
Figure 10:
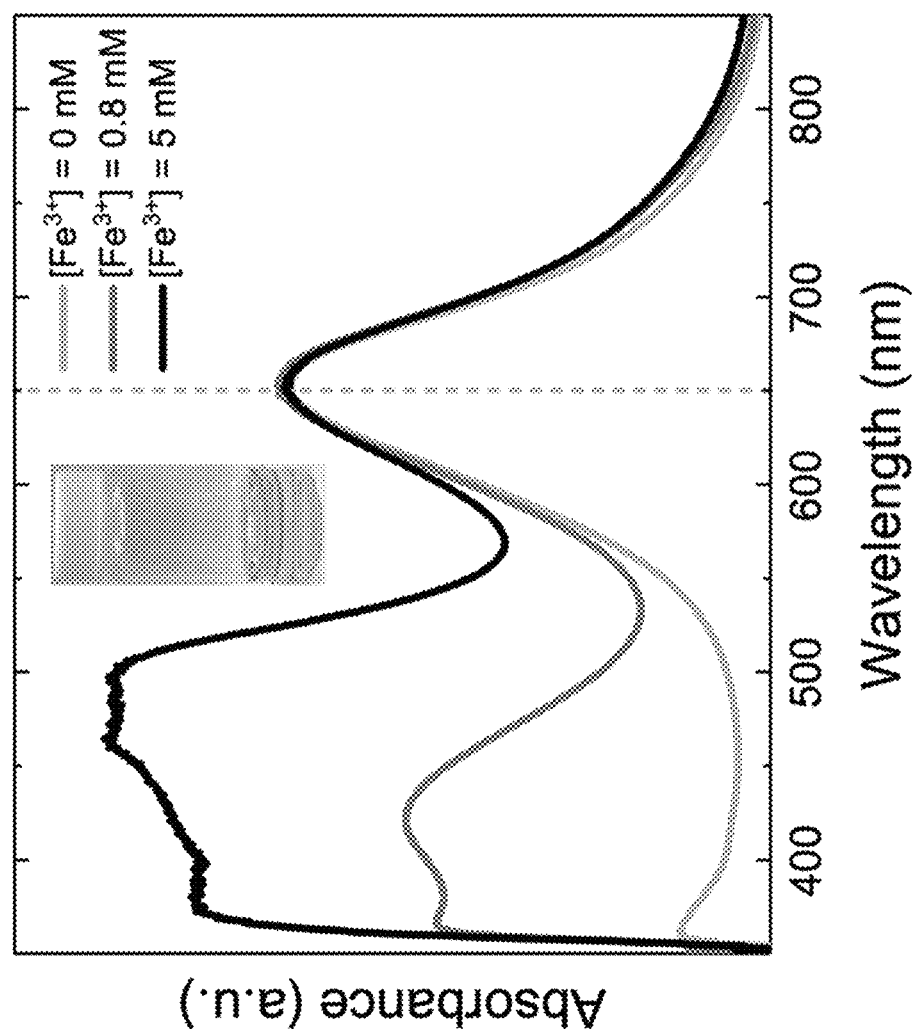
FIG. 10 depicts the effect of Fe cations in ammonia quantification using colorimetric method. After collecting the acid solutions after the protonation of Fe$_2$N samples and neutralizing with KOH solutions, reddish Fe(OH)$_3$ precipitates (see photo inset) can be observed. Moreover, Fe cations can form Fe(III) salicylate complexes during colorimetric quantification. However, the Fe(OH)$_3$ precipitates and the Fe(III) salicylate complexes (with absorbance mainly in 400-500 nm) formed in colorimetric method do not influence the ammonia quantification, given that the maximum concentration of Fe cations at 100% protonation for Fe$_2$N is estimated to be ~1 mM (Table 1) and the quantification peak at 650 nm ($A_{650}$) does not depend on Fe ion concentrations when [Fe$^{3+}$]<5 mM.
Figure 11:
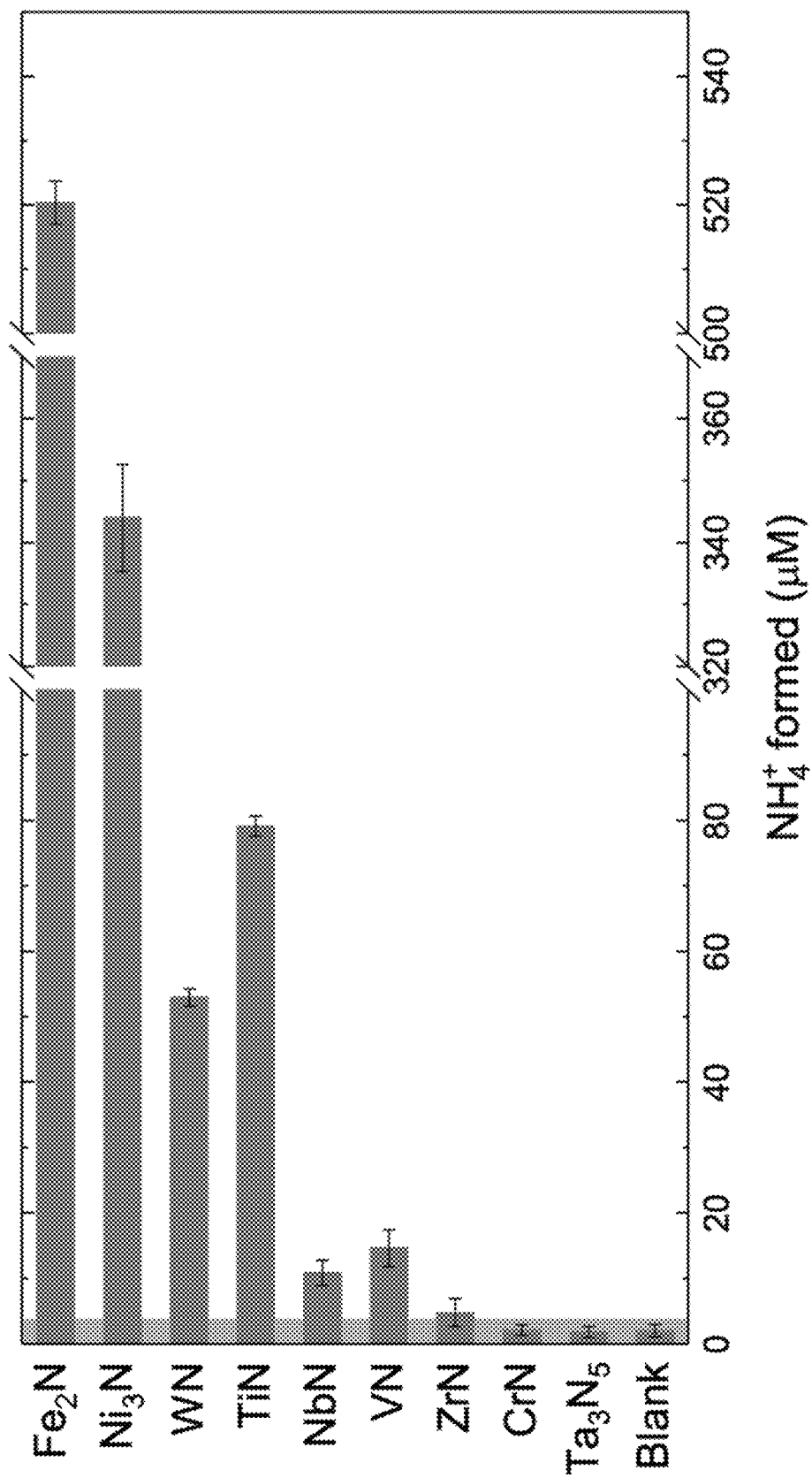
FIG. 11 depicts ammonia quantification results using colorimetric method for all metal nitrides after 24 hours in H$_2$SO$_4$ solutions. For each experiment, 20 mg nitride was added in 300 mL 0.1 M H$_2$SO$_4$ solution. The ammonia concentration in blank sample indicates the amount of ammonia accumulated using the same experimental protocol but without adding nitrides, and was originated from the common ammonia background in ambient conditions (e.g. from the air). Thus, the detection limit (shown as the grey area) for ammonia quantification in this protocol is estimated to be ~4 µM (consistent with the previous reported value). See, for example, Andersen, S. Z. et al. A rigorous electrochemical ammonia synthesis protocol with quantitative isotope measurements. *Nature* 570, 504-508 (2019), which is incorporated by reference in its entirety. Error bars represent s.d. from three independent measurements.

The calibration curves were obtained by plotting the absorbance at 650 nm ($A_{650}$) of the calibration standards versus their calculated ammonia concentrations (FIG. 9). Then, the ammonia concentrations in samples after protonation were determined by projecting the $A_{650}$ of samples following the linear correlations (fitted with zero y-intercept) in the calibration curves. Note that the dilution effect due to neutralization with KOH should be corrected. For Fe-containing samples, $Fe(OH)_3$ precipitates and Fe(III) salicylate complexes can form during the salicylate method. However, in the control experiments by manually adding $Fe^{3+}$ species into the calibration standards, the formation of $Fe(OH)_3$ precipitates and Fe(III) salicylate complex (with absorbance in the 400-500 nm range) did not interfere with the quantification peak at 650 nm (FIG. 10). The detection limit for quantification was estimated to be ~4 µM (FIG. 11), which was originated from the common ammonia background in ambient conditions (e.g. from the air) and was consistent with the value reported previously. See, for example, Andersen, S. Z. et al. A rigorous electrochemical ammonia synthesis protocol with quantitative isotope measurements. *Nature* 570, 504-508 (2019), which is incorporated by reference in its entirety.

Ammonia Quantification by NMR.

Figure 12:
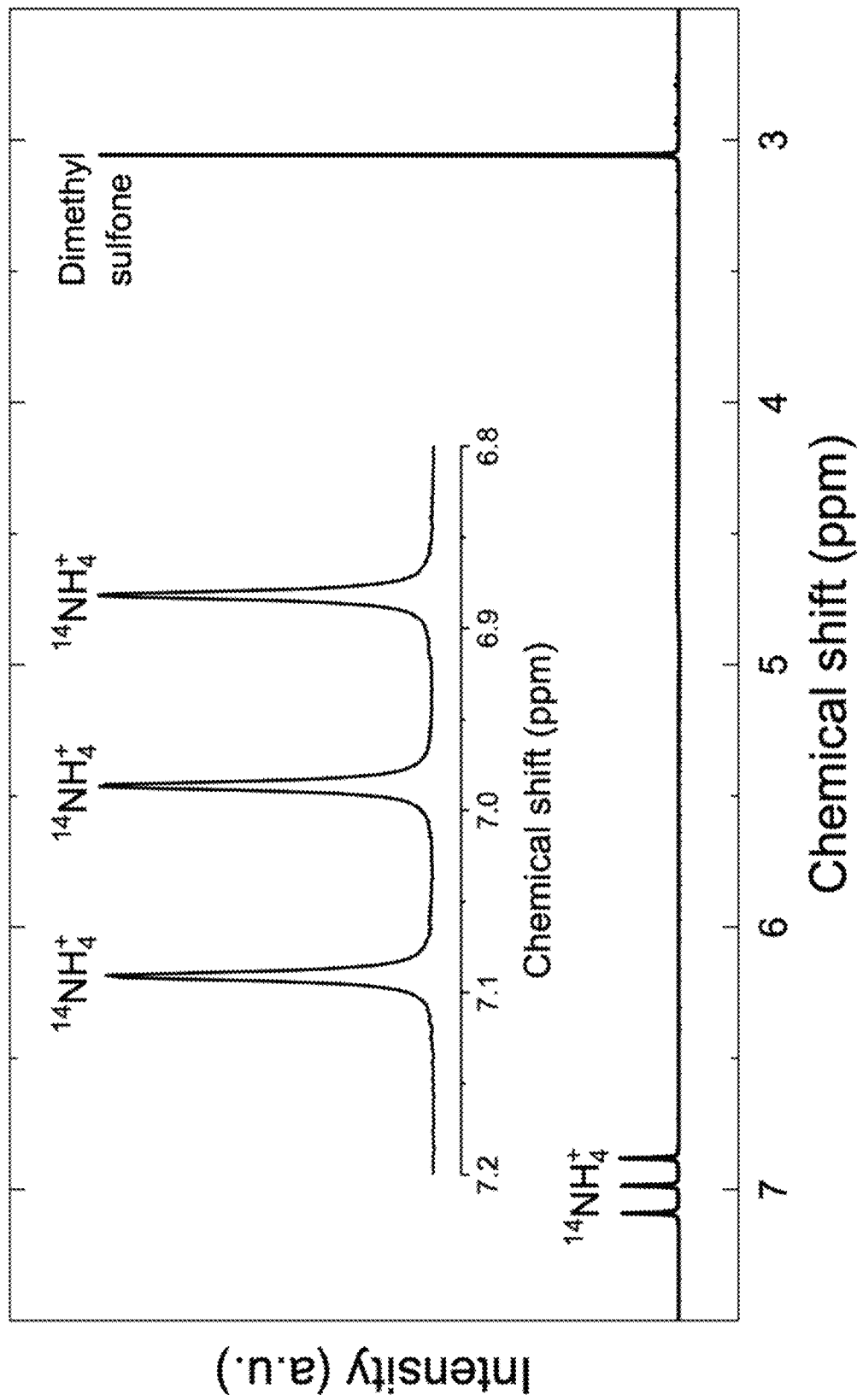
FIG. 12 depicts $^1$H nuclear magnetic resonance spectra for ammonia quantification. Dimethyl sulfone was used as the internal standard. The ammonia concentration was obtained by integrating the $^{14}NH_4^+$ triplet peaks (in 8-6 ppm, with a spacing of 52 Hz) and the dimethyl sulfone singlet peak (~3 ppm). See, for example, Andersen, S. Z. et al. A rigorous electrochemical ammonia synthesis protocol with quantitative isotope measurements. *Nature* 570, 504-508 (2019), which is incorporated by reference in its entirety. The signal-to-noise ratios of ammonia signals in all NMR spectra were greater than 250.

The ammonia concentrations were also quantified using $^1$H NMR spectroscopy. An internal standard was prepared by dissolving dimethyl sulfone (Sigma-Aldrich, standard for quantitative NMR) in freshly prepared DI water. Each NMR sample was prepared by mixing 1 mL of sample solution with the required volume of internal standard so that the internal standard concentration was within the same order of magnitude as the expected ammonia concentration in the sample solution, which was estimated from the colorimetric method. Then, 5 µL concentrated hydrochloric acid (Sigma-Aldrich, ACS reagent, 37%) and 100 µL acetonitrile-$d_3$ (Sigma-Aldrich, ≥99.8 atom % D) were added. The NMR sample was mixed thoroughly in order to ensure complete homogenization prior to introducing the sample into the NMR tube. All NMR spectra were collected at 25° C. using a three-channel Bruker Avance Neo spectrometer operating at 500.34 MHz. The spectrometer is equipped with a 5 mm liquid-nitrogen cooled Prodigy broad band observe cryoprobe, and runs in full-automation mode with a SampleXpress 60 sample changer. NMR measurements were conducted using the $^1$H water suppression method based on 1D excitation sculpting using 180° water-selective pulses. A T1 relaxation time of 20 s was used in all NMR measurements, and the number of scans was selected so that the signal-to-noise ratio of the ammonia signals was greater than 250. NMR spectra were processed using MestReNova by baseline correction of the free induction decay, Fourier transformation and phasing. Chemical shifts were referenced to tetramethylsilane, using a virtual reference provided by the instrument and the locking solvent signal. Prior to integrating the peaks, the baseline in the regions of interest (8 ppm to 6 ppm, and around 3 ppm) was adjusted to zero. The ammonia concentration was obtained by integrating the $^{14}NH_4^+$ triplet peaks (in 8-6 ppm, with a spacing of 52 Hz) and the dimethyl sulfone singlet peak (around 3 ppm). Representative NMR spectra are shown in FIG. 12. See, for example, Andersen, S. Z. et al. A rigorous electrochemical ammonia synthesis protocol with quantitative isotope measurements. *Nature* 570, 504-508 (2019), which is incorporated by reference in its entirety.

ICP-MS Measurements.

Figure 13:
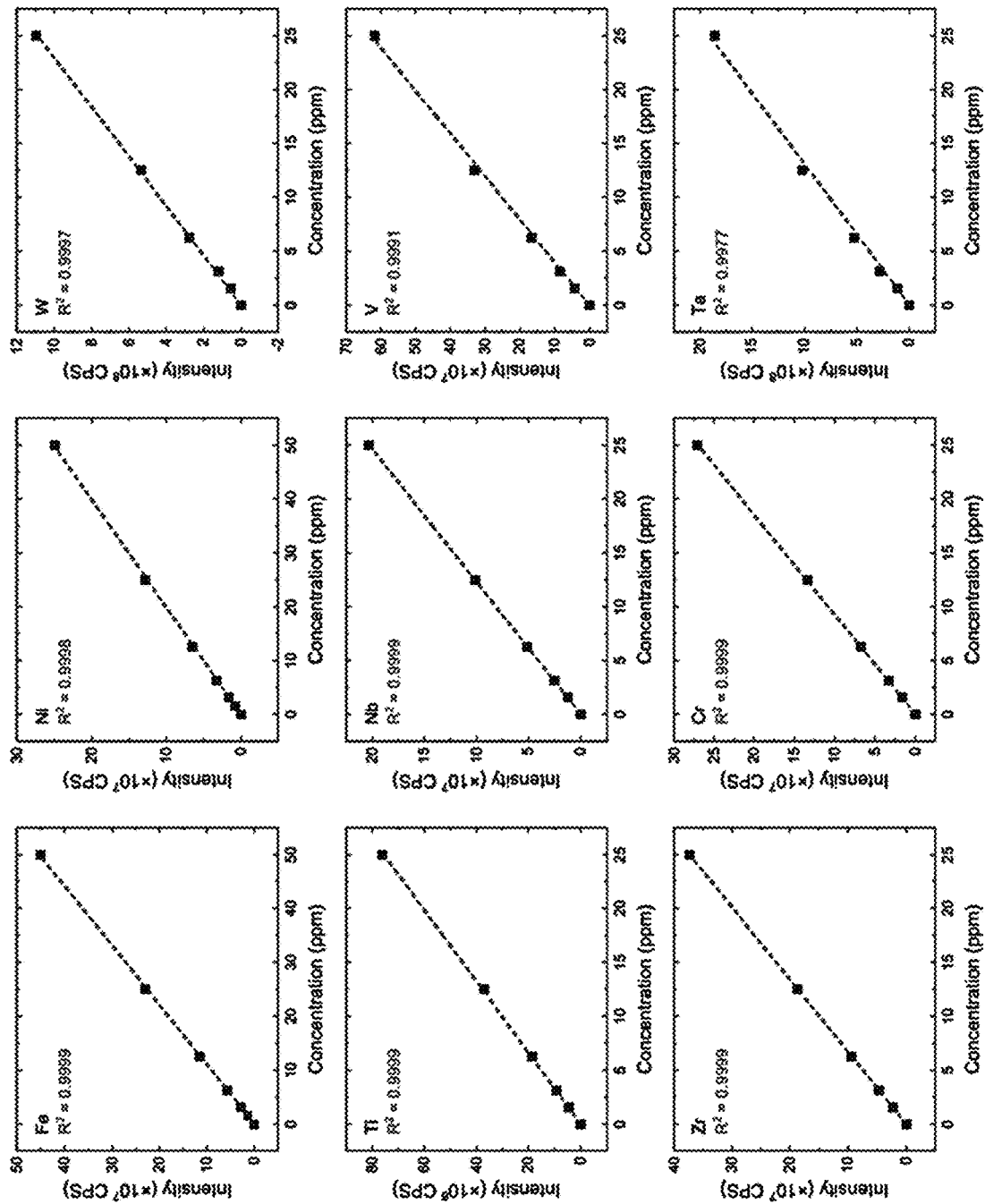
FIG. 13 depicts calibration curves for Fe, Ni, W, Ti, Nb, V, Zr, Cr and Ta cation concentrations in inductively coupled plasma mass spectrometry measurements.
Figure 14:
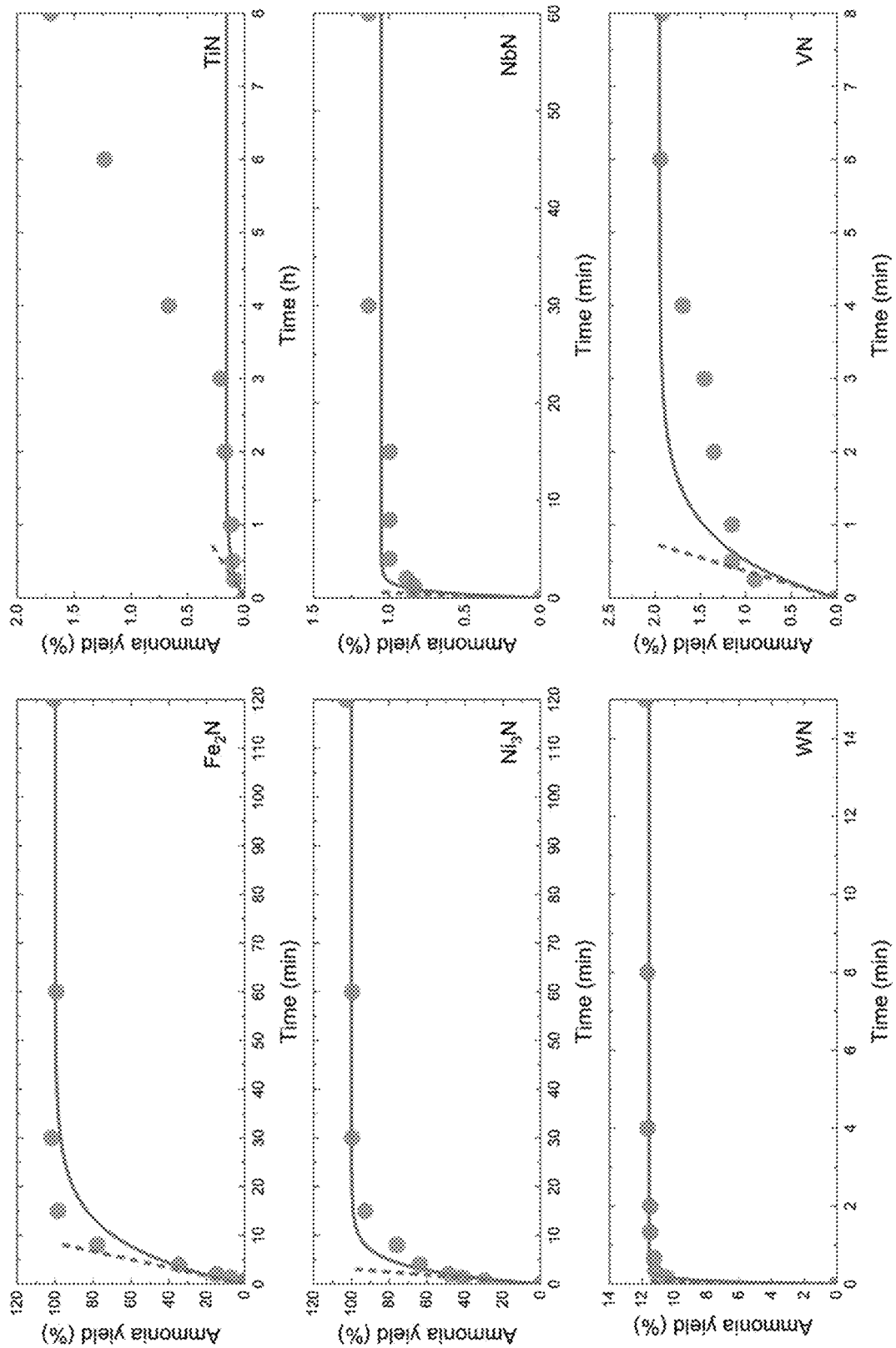
FIG. 14 depicts an estimation of the initial ammonia formation rates. First-order kinetic model ($y=A-Ae^{-kt}$) was used in the kinetic fitting. Although the observed protonation kinetics of many nitrides did not exactly follow the first-order kinetics, the initial rates obtained from the fitting (dash red lines) are considered to be able to capture the protonation kinetics of different metal nitrides, particularly in this study where the initial ammonia formation rates of nitrides were shown to differ across several orders of magnitude (FIGS. 2A-2F). For ZrN, CrN and $Ta_3N_5$, the observed ammonia yields after 24 hours are similar to the detection limit (FIG. 11), and thus the time evolution of ammonia concentrations for ZrN, CrN and $Ta_3N_5$ within the first 24 hours could not be accurately quantified. Here, the initial ammonia formation rates were estimated by averaging their ammonia yields over 24 hours.

The metal ion concentrations were quantified using an Agilent 7900 inductively coupled plasma mass spectrometer, with a wide dynamic range from sub-ppt to percent-level concentrations. The standard solutions were prepared by diluting ICP calibration standards (Inorganic Ventures) with concentration gradient, and the calibration curves are shown in FIG. 13.

DFT Studies.

Periodic plane wave DFT computations were performed to study the bulk electronic structures and energetics of metal nitrides. The PBE functional was used as implemented in the Vienna Ab Initio Simulation Package code and projector augmented wave method for the description of the core-electron interaction, and the plane wave cutoff was set to 450 eV. See, for example, Perdew, J. P., Burke, K. & Ernzerhof, M. Generalized gradient approximation made simple. *Phys. Rev. Lett.* 77, 3865-3868 (1996); Kresse, G. & Hafner, J. Ab initio molecular dynamics for liquid metals. *Phys. Rev. B* 47, 558-561 (1993); Kresse, G. & Furthmüller, J. Efficient iterative schemes for ab initio total-energy calculations using a plane-wave basis set. *Phys. Rev. B* 54, 11169-11186 (1996); Blöchl, P. E. Projector augmented-wave method. *Phys. Rev. B* 50, 17953-17979 (1994); and Jain, A. et al. Commentary: The Materials Project: a materials genome approach to accelerating materials innovation. *APL Mater.* 1, 11002 (2013), each of which is incorporated by reference in its entirety. The PBE functional was chosen to have a consistent method among the nitride chemistry studied. Input structures were taken from the Materials Project: $Fe_2N$ (mp-248), $Ni_3N$ (mp-2033), WN (mp-569228), TiN (mp-492), NbN (mp-1580), VN (mp-925), ZrN (mp-1352), CrN (mp-2132) and $Ta_3N_5$ (mp-27488). DFT calculations for CrN were performed in the antiferromagnetic state, in order to be consistent with previous experimental and computational observations for the magnetic ordering of CrN. DFT calculations for the other nitrides were performed in the ferromagnetic state, and the final magnetic structures are in agreement with previous reports, in which only $Fe_2N$ is found to be ferromagnetic. See, for example, Corliss, L. M., Elliott, N. & Hastings, J. M. Antiferromagnetic structure of CrN. *Phys. Rev.* 117, 929-935 (1960); Filippetti, A., Pickett, W. E. & Klein, B. M. Competition between magnetic and structural transitions in CrN. *Phys. Rev. B* 59, 7043-7050 (1999); and Bainbridge, J., Channing, D. A., Whitlow, W. H. & Pendlebury, R. E. A Mössbauer and X-ray investigation of ξ-Fe2N. *J. Phys. Chem. Solids* 34, 1579-1586 (1973), each of which is incorporated by reference in its entirety. The convergence threshold for electronic steps was $10^{-6}$ eV per unit cell, and the residual forces on all atoms were less than $10^{-4}$ eV. Nitrogen 2p band centers were determined by taking the centroid of the projected DOS of occupied nitrogen 2p states relative the Fermi levels. The COHPs of all nitrides were computed using the LOBSTER program. See, for example, Maintz, S., Deringer, V. L., Tchougréeff, A. L. & Dronskowski, R. LOBSTER: a tool to extract chemical bonding from plane-wave based DFT. *J. Comput. Chem.* 37, 1030-1035 (2016); Deringer, V. L., Tchougréeff, A. L. & Dronskowski, R. Crystal orbital hamilton population (COHP) analysis as projected from plane-wave basis sets. *J. Phys. Chem. A* 115, 5461-5466 (2011); and Maintz, S., Deringer, V. L., Tchougréeff, A. L. & Dronskowski, R. Analytic projection from plane-wave and PAW wavefunctions and application to chemical-bonding analysis in solids. *J. Comput. Chem.* 34, 2557-2567 (2013), each of which is incorporated by reference in its entirety.

The free energy penalty for the creation of bulk nitrogen vacancies and the formation of $NH_4^+$ species ($\Delta G_{N\,vac}$) were calculated based on the theoretical framework proposed previously. See, for example, Rong, X. & Kolpak, A. M. Ab initio approach for prediction of oxide surface structure, stoichiometry, and electrocatalytic activity in aqueous solution. *J. Phys. Chem. Lett.* 6, 1785-1789 (2015), which is incorporated by reference in its entirety. Specifically, $\Delta G_{N\,vac}$ can be considered as the sum of two terms: the free energy change for a nitrogen atom leaving the nitrides ($\Delta G_1$) and the free energy change for the nitrogen atom reacting with protons, electrons and/or water molecules to form $NH_4^+$ species ($\Delta G_2$). $\Delta G_1$ can be computed directly from DFT, and $\Delta G_2$ can be calculated using the computational hydrogen electrode approach and standard electrode potentials for the chemical potentials of aqueous species. Note that $\Delta G_{N\,vac}$ is independent of the choices of intermediate state (e.g. nitrogen atom), because the chemical potential of intermediate state exists in both $\Delta G_1$ and $\Delta G_2$, and thus cancels out during the sum of $\Delta G_1$ and $\Delta G_2$. Here, $N_2$ molecule was used as the intermediate state, and chemical potential of $N_2$ molecule was taken from ref.[64] $\Delta G_2$ is independent of the nitride chemistry, because here only the removal of one nitrogen atom from the nitride lattices is considered. Thus, $\Delta G_2$ is the same for all nitrides, and can be considered as a correction term on $\Delta G_1$ to adjust the reference state for $\Delta G_{N\,vac}$ from $N_2$ molecule to $NH_4^+$ ions. Supercells were used with dimensions lager than 10 Å for all nitrides to avoid self-interaction between nitrogen vacancies due to the periodic boundary conditions.

The computationally predicted Pourbaix diagrams and Pourbaix above-hull energies ($\Delta G_{pbx}$) were obtained using the Materials Project API. See, for example, Jain, A. et al. Commentary: The Materials Project: a materials genome approach to accelerating materials innovation. *APL Mater.* 1, 11002 (2013); and Ong, S. P. et al. The materials application programming interface (API): a simple, flexible and efficient api for materials data based on representational state transfer (REST) principles. *Comput. Mater. Sci.* 97, 209-215 (2015), each of which is incorporated by reference in its entirety. All metal cation concentrations are assumed to be $10^{-6}$M in the aqueous solutions. The thermodynamically stable oxide phases were determined using the phase diagram app in the Materials Project. See, for example, Jain, A. et al. Commentary: The Materials Project: a materials genome approach to accelerating materials innovation. *APL Mater.* 1, 11002 (2013), which is incorporated by reference in its entirety.

Synchrotron X-Ray Measurements.

N Kα XES spectra were collected at Beamline 10ID-2 of the Canadian Light Source. The experiments were performed with the samples at room temperature under ultra-high vacuum conditions ($10^{-9}$ torr), with linear polarization of the incident beam 45° to the sample surfaces and under nonresonant conditions with incident photon energies ~45 eV above resonance. Experimental nitrogen 2p band centers were estimated by aligning the hybridization features in N Kα XES spectra with those in valence band XPS spectra using the method developed previously. See, for example, Hong, W. T. et al. Probing LaMO3 metal and oxygen partial density of states using X-ray emission, absorption, and photoelectron spectroscopy. *J. Phys. Chem. C* 119, 2063-2072 (2015); and Hong, W. T. et al. Charge-transfer-energy-dependent oxygen evolution reaction mechanisms for perovskite oxides. *Energy Environ. Sci.* 10, 2190-2200 (2017), each of which is incorporated by reference in its entirety. Specifically, the feature positions were determined using spectral smoothing and differentiation, and the minima in the second derivative were used to quantify the positions of features visible in the raw spectra. N Kα XES spectra were aligned to valence band XPS spectra using the most prominent hybridization features. The centroids of N Kα XES spectra relative to the Fermi levels were calculated to obtain the nitrogen 2p band centers. The standard errors in spectral alignment and extraction of ligand band centers were estimated to be ~0.5 eV. See, for example, Hong, W. T. et al. Charge-transfer-energy-dependent oxygen evolution reaction mechanisms for perovskite oxides. *Energy Environ. Sci.* 10, 2190-2200 (2017), which is incorporated by reference in its entirety. More detailed discussion about the analysis was described in previous works. See, for example, Hong, W. T. et al. Probing $LaMO_3$ metal and oxygen partial density of states using X-ray emission, absorption, and photoelectron spectroscopy. *J. Phys. Chem. C* 119, 2063-2072 (2015); and Hong, W. T. et al. Charge-transfer-energy-dependent oxygen evolution reaction mechanisms for perovskite oxides. *Energy Environ. Sci.* 10, 2190-2200 (2017), which is incorporated by reference in its entirety.

TXM images were collected at Beamline 6-2c of the Stanford Synchrotron Radiation Lightsource. Two-dimensional full-field TXM was performed to quantify the local oxidation states by measuring the absorption spectra of a specific element with a nominal spatial resolution of ~30 nm. See, for example, Meirer, F. et al. Three-dimensional imaging of chemical phase transformations at the nanoscale with full-field transmission X-ray microscopy. *J. Synchrotron Rad.* 18, 773-781 (2011), which is incorporated by reference in its entirety. Specifically, the XANES spectrum of each pixel per voxel was generated by imposing and aligning the absorption intensity at different energy. Transmission images were recorded over 115 energy points. In the near-edge regions, an energy step of 1 eV was chosen to achieve the necessary energy resolution for XANES analysis. The energy step outside of the near-edge regions was 15 eV for pre-edge regions and 10 eV for post-edge regions, covering a relatively large energy window for the proper normalization of spectra using a well-established method. See, for example, Weng, T.-C., Waldo, G. S. & Penner-Hahn, J. E. A method for normalization of X-ray absorption spectra. *J. Synchrotron Rad.* 12, 506-510 (2005), which is incorporated by reference in its entirety. An in-house developed software package known as TXM Wizard was used for the correction and normalization of XANES spectra. See, for example, Liu, Y. et al. TXM-Wizard: a program for advanced data collection and evaluation in full-field transmission X-ray microscopy. *J. Synchrotron Rad.* 19, 281-287 (2012), which is incorporated by reference in its entirety. After the normalization, the pre-edge of the spectra was set to be zero and the post-edge was set to be one. To quantify the metal oxidation states, the edge energy, which is defined as the energy that corresponds to a normalized intensity of 0.5 for Fe and Ni K-edge spectra, or the maximum normalized intensity for W L-edge spectra, was extracted by the spline interpolation of all data points. The metal oxidation states were calculated by relating the edge energy with the know oxidation states of single-phase standards using linear regression, and the edge energy of each pixel was used to generate the oxidation state maps.

Other embodiments are within the scope of the following claims.

What is claimed is:

1. A method of generating ammonia comprising:
providing an ammonia precursor including a $d^6$-$d^8$ transition metal nitride; and
exposing the ammonia precursor to an acid to generate ammonia.

2. The method of claim 1, wherein the ammonia precursor includes an iron nitride or a nickel nitride.

3. The method of claim 1, wherein the ammonia precursor includes $Fe_2N$ or $Ni_3N$.

4. The method of claim 1, wherein the $d^6$-$d^8$ transition metal nitride is an iron nitride or nickel nitride.

5. The method of claim 1, wherein the ammonia precursor is exposed to the acid at a temperature of less than 100 degrees C.

6. The method of claim 1, wherein the ammonia precursor is exposed to the acid at a pressure of less than 2 atmospheres.

7. The method of claim 1, wherein the acid is an aqueous acid.

8. The method of claim 1, wherein the acid includes sulfuric acid, phosphoric acid, or perchloric acid.

9. The method of claim 1, wherein the ammonia precursor includes $Fe_2N$ or $Ni_3N$ and the acid includes sulfuric acid.

10. The method of claim 1, further comprising recovering the ammonia as $NH_3$ or $NH_4^+$.

11. The method of claim 1, further comprising controlling an amount of acid to control an amount of ammonia generated.

12. The method of claim 1, further comprising recovering a transition metal ion released by the ammonia precursor.

13. An ammonia generator comprising:
a reaction chamber including an ammonia precursor;
an acid source adjacent to the reaction chamber; and
an acid delivery device configured to transport an acid from the acid source to the reaction chamber, wherein the ammonia precursor includes a $d^6$-$d^8$ transition metal nitride.

14. The ammonia generator of claim 13, wherein the ammonia precursor includes an iron nitride or a nickel nitride.

15. The ammonia generator of claim 13, wherein the ammonia precursor includes $Fe_2N$ or $Ni_3N$.

16. The ammonia generator of claim 13, further comprising a temperature controller.

17. The ammonia generator of claim 13, wherein the acid is an aqueous acid.

18. The ammonia generator of claim 13, wherein the acid includes sulfuric acid, phosphoric acid, or perchloric acid.

19. The ammonia generator of claim 13, wherein the ammonia precursor includes $Fe_2N$ or $Ni_3N$ and the acid includes sulfuric acid.

\* \* \* \* \*